US009023959B2

(12) United States Patent
McDaniel et al.

(10) Patent No.: US 9,023,959 B2
(45) Date of Patent: May 5, 2015

(54) METHODS FOR PRODUCING FLUORIDED-CHLORIDED SILICA-COATED ALUMINA ACTIVATOR-SUPPORTS AND CATALYST SYSTEMS CONTAINING THE SAME

(71) Applicant: Chevron Phillips Chemical Company LP, The Woodlands, TX (US)

(72) Inventors: Max P. McDaniel, Bartlesville, OK (US); Uriah Kilgore, Bartlesville, OK (US); Qing Yang, Bartlesville, OK (US); Kathy S. Collins, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 13/941,573

(22) Filed: Jul. 15, 2013

(65) Prior Publication Data
US 2015/0018503 A1 Jan. 15, 2015

(51) Int. Cl.
*C08F 4/02* (2006.01)
*C08F 4/6592* (2006.01)
*C08F 10/00* (2006.01)
*C08F 210/02* (2006.01)
*C08F 4/76* (2006.01)
*C08F 4/659* (2006.01)

(52) U.S. Cl.
CPC ... *C08F 4/02* (2013.01); *C08F 4/76* (2013.01); *C08F 4/025* (2013.01); *C08F 4/65912* (2013.01); *C08F 4/65916* (2013.01); *C08F 4/6592* (2013.01); *C08F 210/02* (2013.01); *Y10S 526/943* (2013.01)

(58) Field of Classification Search
CPC ........ C08F 4/02; C08F 4/025; C08F 4/65912; C08F 4/6592; C08F 4/65916; C08F 210/02; C08F 10/00
USPC .......... 502/103, 120, 152, 414, 439; 526/160, 526/165, 348, 943, 129, 130
See application file for complete search history.

(56) References Cited

U.S. PATENT DOCUMENTS

| | | |
|---|---|---|
| 3,242,099 A | 3/1966 | Manyik |
| 3,248,179 A | 4/1966 | Norwood et al. |
| 4,501,885 A | 2/1985 | Sherk et al. |
| 4,588,790 A | 5/1986 | Jenkins, III et al. |
| 4,794,096 A | 12/1988 | Ewen |
| 4,808,561 A | 2/1989 | Welborn, Jr. et al. |
| 5,352,749 A | 10/1994 | DeChellis et al. |
| 5,436,304 A | 7/1995 | Griffin et al. |
| 5,455,314 A | 10/1995 | Burns et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,239,235 B1 | 5/2001 | Hottovy et al. |
| 6,262,191 B1 | 7/2001 | Hottovy et al. |
| 6,667,274 B1 | 12/2003 | Hawley et al. |
| 6,833,415 B2 | 12/2004 | Kendrick et al. |
| 7,026,494 B1 | 4/2006 | Yang et al. |
| 7,041,617 B2 | 5/2006 | Jensen et al. |
| 7,199,073 B2 | 4/2007 | Martin et al. |
| 7,226,886 B2 | 6/2007 | Jayaratne et al. |
| 7,312,283 B2 | 12/2007 | Martin et al. |
| 7,390,764 B2 | 6/2008 | McDaniel et al. |
| 7,517,939 B2 | 4/2009 | Yang et al. |
| 7,579,415 B2 | 8/2009 | Agapiou et al. |
| 7,619,047 B2 | 11/2009 | Yang et al. |
| 7,763,561 B2 | 7/2010 | McDaniel et al. |
| 7,790,820 B2 | 9/2010 | Jensen et al. |
| 7,863,210 B2 | 1/2011 | Murray et al. |
| 7,884,163 B2 | 2/2011 | McDaniel et al. |
| 7,910,763 B2 | 3/2011 | Jayaratne et al. |
| 7,919,639 B2 | 4/2011 | Murray et al. |
| 8,012,900 B2 | 9/2011 | Murray et al. |
| 8,058,200 B2 | 11/2011 | Yang et al. |
| 8,080,681 B2 | 12/2011 | Murray et al. |
| 2004/0059070 A1 | 3/2004 | Whitte et al. |
| 2010/0076167 A1 | 3/2010 | McDaniel et al. |
| 2011/0092357 A1 | 4/2011 | McDaniel et al. |

OTHER PUBLICATIONS

Li, et al., entitled "Coordination Copolymerization of Severely Encumbered Isoalkenes with Ethylene: Enhanced Enchainment Mediated by Binuclear Catalysts and Cocatalysts," *J. Am. Chem. Soc.*, 2005, 127, pp. 14756-14768.
*Modern Plastics Encyclopedia*, Mid-Nov. 1995 Issue, vol. 72, No. 12, 3 pages.
*Film Extrusion Manual—Process, Materials, Properties*, TAPPI Press, 1992, 16 pages.
International Patent Application PCT/US2014/045708 Search Report dated Dec. 9, 2014.

*Primary Examiner* — Caixia Lu
(74) *Attorney, Agent, or Firm* — Merchant & Gould

(57) ABSTRACT

Methods for the preparation of fluorided-chlorided silica-coated alumina activator-supports are disclosed. These activator-supports can be used in catalyst systems for the production of olefin-based polymers, such as polyethylene and polypropylene.

20 Claims, 6 Drawing Sheets

METHODS FOR PRODUCING FLUORIDED-CHLORIDED SILICA-COATED ALUMINA ACTIVATOR-SUPPORTS AND CATALYST SYSTEMS CONTAINING THE SAME

BACKGROUND OF THE INVENTION

The present invention relates generally to the field of olefin polymerization catalysis, supported catalyst compositions, methods for the polymerization and copolymerization of olefins, and polyolefins. More specifically, this invention relates to fluorided-chlorided silica-coated alumina activator-supports, methods for producing such fluorided-chlorided silica-coated alumina activator-supports, and to catalyst compositions employing these fluorided-chlorided silica-coated alumina activator-supports.

It would be beneficial to produce activator-supports that would have increased catalyst activity in olefin polymerization processes, for example, using metallocene-based catalyst systems for the production of ethylene-based polymers and propylene-based polymers. Accordingly, it is to these ends that the present invention is directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

Processes for producing fluorided-chlorided silica-coated alumina activator-supports are disclosed and described herein. One such process for producing a fluorided-chlorided silica-coated alumina can comprise (a) calcining a silica-coated alumina at a peak calcining temperature to produce a calcined silica-coated alumina; (b) contacting the calcined silica-coated alumina with a chlorine-containing compound and calcining at a peak chloriding temperature to produce a chlorided silica-coated alumina; and (c) contacting the chlorided silica-coated alumina with a fluorine-containing compound and calcining at a peak fluoriding temperature to produce the fluorided-chlorided silica-coated alumina. In this process, the chloriding step is performed prior to the fluoriding step. Moreover, in some aspects, the peak chloriding temperature and/or the peak fluoriding temperature can be less than or equal to the peak calcining temperature.

Catalyst compositions containing these fluorided-chlorided silica-coated alumina activator-supports are also provided by the present invention. One such catalyst composition can comprise a metallocene compound and an activator-support comprising a fluorided-chlorided silica-coated alumina. Optionally, in one aspect, this catalyst composition can further comprise an organoaluminum compound, while in another aspect, the catalyst composition can further comprise a co-catalyst such as an aluminoxane compound, organozinc compound, organoboron or organoborate compound, ionizing ionic compound, and the like, or a combination thereof.

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer under polymerization conditions to produce an olefin polymer, wherein the catalyst composition comprises a metallocene compound and a fluorided-chlorided silica-coated alumina activator-support. Co-catalysts, such as organoaluminum compounds, can be employed in this process.

Polymers produced from the polymerization of olefins, resulting in ethylene-based or propylene-based homopolymers or copolymers, for example, can be used to produce various articles of manufacture.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
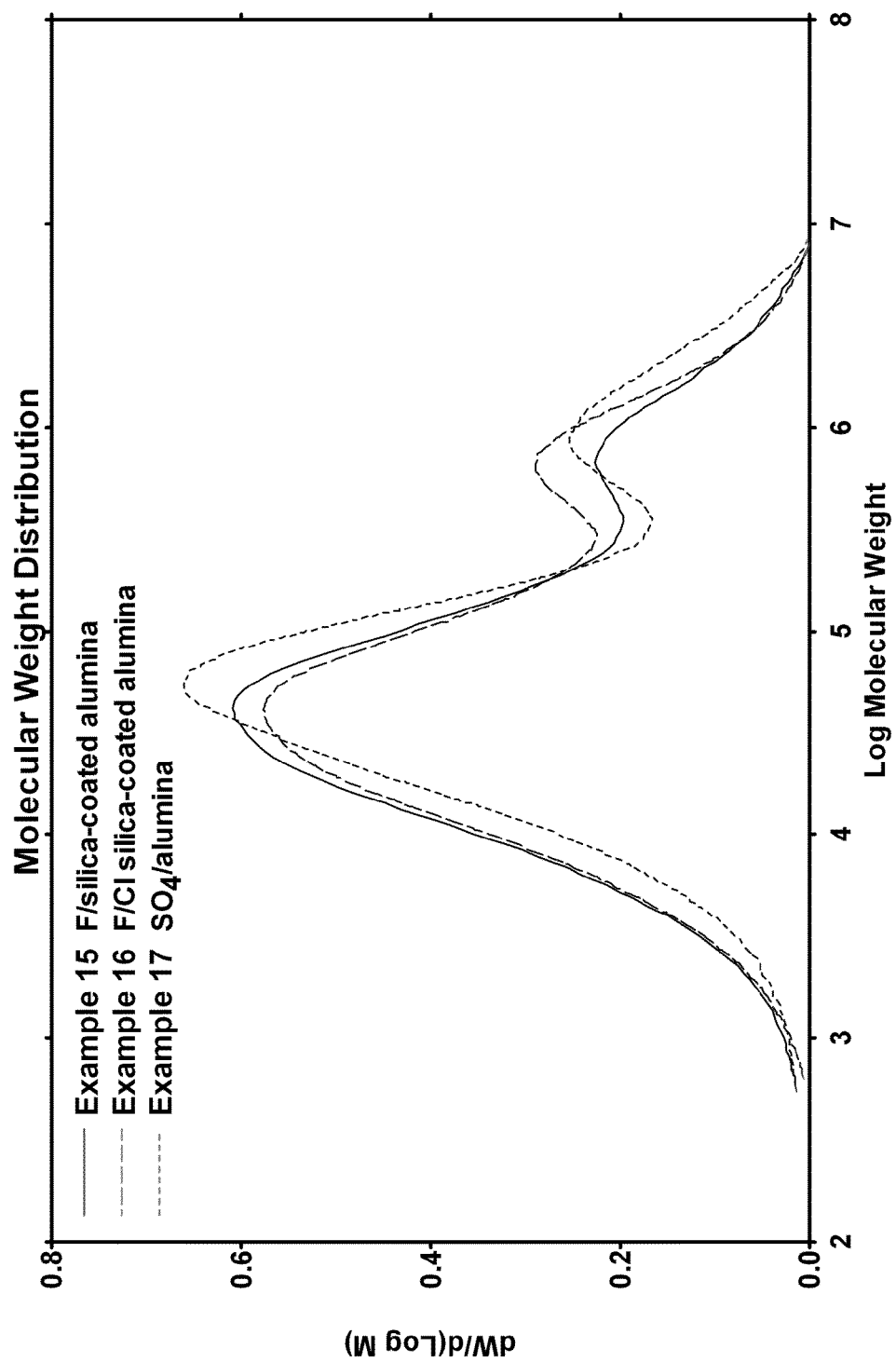
FIG. 1 presents a plot of the molecular weight distributions of the polymers of Examples 15-17.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described herein in terms of "comprising" various components or steps, the compositions and methods can also "consist essentially of" or "consist of" the various components or steps, unless stated otherwise. For example, a catalyst composition consistent with aspects of the present invention can comprise; alternatively, can consist essentially of; or alternatively, can consist of; (i) a fluorided-chlorided silica-coated alumina, (ii) a metallocene compound, and (iii) optionally, a co-catalyst.

The terms "a," "an," and "the" are intended to include plural alternatives, e.g., at least one. For instance, the disclosure of "a chlorine-containing compound," "a fluorine-containing compound," etc., is meant to encompass one, or mixtures or combinations of more than one, chlorine-containing compound, fluorine-containing compound, etc., unless otherwise specified.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

For any particular compound disclosed herein, the general structure or name presented is also intended to encompass all structural isomers, conformational isomers, and stereoisomers that can arise from a particular set of substituents, unless indicated otherwise. Thus, a general reference to a compound includes all structural isomers unless explicitly indicated otherwise; e.g., a general reference to pentane includes n-pentane, 2-methyl-butane, and 2,2-dimethylpropane, while a general reference to a butyl group includes an n-butyl group, a sec-butyl group, an iso-butyl group, and a tert-butyl group. Additionally, the reference to a general structure or name encompasses all enantiomers, diastereomers, and other optical isomers whether in enantiomeric or racemic forms, as well as mixtures of stereoisomers, as the context permits or requires. For any particular formula or name that is presented, any general formula or name presented also encompasses all conformational isomers, regioisomers, and stereoisomers that can arise from a particular set of substituents.

The term "substituted" when used to describe a group, for example, when referring to a substituted analog of a particular group, is intended to describe any non-hydrogen moiety that formally replaces a hydrogen in that group, and is intended to be non-limiting. A group or groups can also be referred to herein as "unsubstituted" or by equivalent terms such as "non-substituted," which refers to the original group in which a non-hydrogen moiety does not replace a hydrogen within that group. Unless otherwise specified, "substituted" is intended to be non-limiting and include inorganic substituents or organic substituents as understood by one of ordinary skill in the art.

The term "polymer" is used herein generically to include olefin homopolymers, copolymers, terpolymers, and so forth. A copolymer is derived from an olefin monomer and one olefin comonomer, while a terpolymer is derived from an olefin monomer and two olefin comonomers. Accordingly, "polymer" encompasses copolymers, terpolymers, etc., derived from any olefin monomer and comonomer(s) disclosed herein. Similarly, an ethylene polymer would include ethylene homopolymers, ethylene copolymers, ethylene terpolymers, and the like. As an example, an olefin copolymer, such as an ethylene copolymer, can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer.

In like manner, the scope of the term "polymerization" includes homopolymerization, copolymerization, terpolymerization, etc. Therefore, a copolymerization process can involve contacting one olefin monomer (e.g., ethylene) and one olefin comonomer (e.g., 1-hexene) to produce a copolymer.

The term "co-catalyst" is used generally herein to refer to compounds such as aluminoxane compounds, organoboron or organoborate compounds, ionizing ionic compounds, organoaluminum compounds, organozinc compounds, organomagnesium compounds, organolithium compounds, and the like, that can constitute one component of a catalyst composition, when used, for example, in addition to an activator-support. The term "co-catalyst" is used regardless of the actual function of the compound or any chemical mechanism by which the compound may operate.

The term "metallocene" as used herein, describe compounds comprising at least one $\eta^3$ to $\eta^5$-cycloalkadienyl-type moiety, wherein $\eta^3$ to $\eta^5$-cycloalkadienyl moieties include cyclopentadienyl ligands, indenyl ligands, fluorenyl ligands, and the like, including partially saturated or substituted derivatives or analogs of any of these. Possible substituents on these ligands may include H, therefore this invention comprises ligands such as tetrahydroindenyl, tetrahydrofluorenyl, octahydrofluorenyl, partially saturated indenyl, partially saturated fluorenyl, substituted partially saturated indenyl, substituted partially saturated fluorenyl, and the like. In some contexts, the metallocene can be referred to simply as the "catalyst," in much the same way the term "co-catalyst" can be used herein to refer to, for example, an organoaluminum compound.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst, the metallocene compound, any olefin monomer used to prepare a precontacted mixture, or the activator-support, after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, can be used interchangeably throughout this disclosure.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods, devices, and materials similar or equivalent to those described herein can be used in the practice or testing of the invention, the typical methods, devices and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants disclose several types of ranges in the present invention. When Applicants disclose or claim a range of any type, Applicants' intent is to disclose or claim individually each possible number that such a range could reasonably encompass, including end points of the range as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that a moiety is a $C_1$ to $C_{18}$ hydrocarbyl group, or in alternative language, a hydrocarbyl group having from 1 to 18 carbon atoms, as used herein, refers to a moiety that can be selected independently from a hydrocarbyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ hydrocarbyl group), and also including any combination of ranges between these two numbers (for example, a $C_2$ to $C_4$ and a $C_{12}$ to $C_{16}$ hydrocarbyl group).

Similarly, another representative example follows for the peak calcining temperature disclosed in an aspect of this invention. By a disclosure that the peak calcining temperature can be in a range from about 400° C. to about 1000° C., Applicants intend to recite that the peak calcining temperature can be any temperature within the range and, for example, can be equal to about 400° C., about 450° C., about 500° C., about 550° C., about 600° C., about 650° C., about 700° C., about 750° C., about 800° C., about 850° C., about 900° C., about 950° C., or about 1000° C. Additionally, the peak calcining temperature can be within any range from about 400° C. to about 1000° C. (for example, from about 500° C. to about 800° C.), and this also includes any combination of ranges between about 400° C. to about 1000° C. (for example, the peak calcining temperature can be in a range from about 400° C. to about 600° C. or from about 700° C. to about 900° C.). Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

DETAILED DESCRIPTION OF THE INVENTION

Disclosed herein are fluorided-chlorided silica-coated alumina activator-supports, methods for producing such fluorided-chlorided silica-coated alumina activator-supports, and to catalyst compositions employing these fluorided-chlorided silica-coated alumina activator-supports. Such catalyst compositions can be used to polymerize olefins, such as ethylene and propylene, to produce various homopolymers, copolymers, and the like.

Metallocene Compounds

In some aspects, the catalyst system can comprise an activator-support comprising a fluorided-chlorided silica-coated alumina, a metallocene compound (one or more than one), and optionally, a co-catalyst. Generally, the metallocene compound can comprise, for example, a transition metal (one or more than one) from Groups IIIB-VIIIB of the Periodic Table of the Elements. In one aspect, the metallocene compound can comprise a Group III, IV, V, or VI transition metal, or a combination of two or more transition metals. The metallocene compound can comprise chromium, titanium, zirconium, hafnium, vanadium, or a combination thereof, or can comprise titanium, zirconium, hafnium, or a combination thereof, in certain aspects. Accordingly, the metallocene compound can comprise titanium, or zirconium, or hafnium, either singly or in combination.

While not being limited thereto, the metallocene compound can comprise an unbridged metallocene compound in an aspect of this invention. For instance, the metallocene compound can comprise an unbridged zirconium or hafnium based metallocene compound and/or an unbridged zirconium and/or hafnium based dinuclear metallocene compound. In one aspect, the metallocene compound can comprise an unbridged zirconium or hafnium based metallocene compound containing two cyclopentadienyl groups, two indenyl groups, or a cyclopentadienyl and an indenyl group. In another aspect, the metallocene compound can comprise an unbridged zirconium based metallocene compound containing two cyclopentadienyl groups, two indenyl groups, or a cyclopentadienyl and an indenyl group. Illustrative and non-limiting examples of unbridged metallocene compounds (e.g., with zirconium or hafnium) that can be employed in catalyst systems consistent with aspects of the present invention are described in U.S. Pat. Nos. 7,199,073, 7,226,886, 7,312,283, and 7,619,047, the disclosures of which are incorporated herein by reference in their entirety.

In other aspects, the metallocene compound can comprise an unbridged zirconium and/or hafnium based dinuclear metallocene compound. For example, the metallocene compound can comprise an unbridged zirconium based homodinuclear metallocene compound, or an unbridged hafnium based homodinuclear metallocene compound, or an unbridged zirconium and/or hafnium based heterodinuclear metallocene compound (i.e., a dinuclear compound with two hafniums, or two zirconiums, or one zirconium and one hafnium). These and other suitable dinuclear compounds (bridged and unbridged) are described in U.S. Pat. Nos. 7,863,210, 7,919, 639, 8,012,900, and 8,080,681, the disclosures of which are incorporated herein by reference in their entirety.

The metallocene compound can comprise a bridged metallocene compound, e.g., with titanium, zirconium, or hafnium. Accordingly, the metallocene compound can comprise a bridged zirconium based metallocene compound with a fluorenyl group, and with no aryl groups on the bridging group, or a bridged zirconium based metallocene compound with a cyclopentadienyl group and a fluorenyl group, and with no aryl groups on the bridging group. Such bridged metallocenes, in some aspects, can contain an alkenyl substituent (e.g., a terminal alkenyl) on the bridging group and/or on a cyclopentadienyl-type group (e.g., a cyclopentadienyl group, a fluorenyl group, etc.).

In another aspect, the metallocene compound can comprise a bridged zirconium or hafnium based metallocene compound with a fluorenyl group, and an aryl group on the bridging group. Thus, the metallocene compound can comprise a bridged zirconium or hafnium based metallocene compound with a cyclopentadienyl group and fluorenyl group, and an aryl group on the bridging group; alternatively, a bridged zirconium based metallocene compound with a fluorenyl group, and an aryl group on the bridging group; or alternatively, a bridged hafnium based metallocene compound with a fluorenyl group, and an aryl group on the bridging group. In these and other aspects, the aryl group on the bridging group can be a phenyl group. Optionally, these bridged metallocenes can contain an alkenyl substituent (e.g., a terminal alkenyl) on the bridging group and/or on a cyclopentadienyl-type group.

In yet another aspect, the metallocene compound can comprise a bridged zirconium or hafnium based metallocene compound with two indenyl groups (e.g., a bis-indenyl metallocene compound). Hence, the metallocene compound can comprise a bridged zirconium based metallocene compound with two indenyl groups or alternatively, a bridged hafnium based metallocene compound with two indenyl groups. In some aspects, an aryl group can be present on the bridging group, while in other aspects, there are no aryl groups present on the bridging group. Optionally, these bridged indenyl metallocenes can contain an alkenyl substituent (e.g., a terminal alkenyl) on the bridging group and/or on the indenyl group (one or both indenyl groups). The bridging atom of the bridging group can be, for instance, a carbon atom or a silicon atom; alternatively, the bridge can contain a chain of two carbon atoms, a chain of two silicon atoms, and so forth.

Illustrative and non-limiting examples of bridged metallocene compounds (e.g., with zirconium or hafnium) that can be employed in catalyst systems consistent with aspects of the present invention are described in U.S. Pat. Nos. 7,026,494, 7,041,617, 7,226,886, 7,312,283, 7,517,939, and 7,619,047, the disclosures of which are incorporated herein by reference in their entirety.

In one aspect, the catalyst composition contains only one metallocene compound, while in another aspect, the catalyst composition contains two or more metallocene compounds. If two or more metallocene compounds are used, the relative amounts of each respective metallocene compound are not restricted to any particular range. For instance, if the catalyst composition contains two metallocene compounds, the weight ratio of the first metallocene catalyst component to the second metallocene catalyst component can be in a range of from about 1:100 to about 100:1, from about 1:50 to about 50:1, from about 1:20 to about 20:1, from about 1:10 to about 10:1, or from about 1:5 to about 5:1. Accordingly, suitable ranges for the weight ratio of the first metallocene catalyst component to the second metallocene catalyst component can include, but are not limited to, from about 1:4 to about 4:1, from about 1:3 to about 3:1, from about 1:2 to about 2:1, from about 1:1.5 to about 1.5:1, from about 1:1.25 to about 1.25:1, or from about 1:1.1 to about 1.1:1, and the like.

Fluorided-Chlorided Silica-Coated Aluminas

Various processes for producing a fluorided-chlorided silica-coated alumina are disclosed and described herein. One such process to produce a fluorided-chlorided silica-coated alumina activator-support can comprise (or consist essentially of, or consist of) (a) calcining a silica-coated alumina at a peak calcining temperature to produce a calcined silica-coated alumina, (b) contacting the calcined silica-coated alumina with a chlorine-containing compound and calcining at a peak chloriding temperature to produce a chlorided silica-coated alumina, and (c) contacting the chlorided silica-coated alumina with a fluorine-containing compound and calcining at a peak fluoriding temperature to produce the fluorided-chlorided silica-coated alumina. While not wishing to be bound by theory, applicants believe that performing the chloriding step prior to the fluoriding step (instead of the reverse, fluoriding before chloriding) can result in an activator-support having, for example (and unexpectedly), higher resultant catalyst activity (the activator-support produced in this manner also may have higher surface area and/or pore volume and/or acidity).

Generally, the features of any of the processes disclosed herein (e.g., the silica-coated alumina solid oxide, the conditions under which the calcining step is conducted (such as the peak calcining temperature), the chlorine-containing compound, the conditions under which the chloriding step is conducted (such as the peak chloriding temperature), the fluorine-containing compound, the conditions under which the fluoriding step is conducted (such as the peak fluoriding temperature), the surface area of the fluorided-chlorided silica-coated alumina, among others) are independently described herein, and these features can be combined in any combination to further describe the disclosed processes. Moreover, other process steps can be conducted before, during, and/or after any of the steps listed in the disclosed processes, unless stated otherwise. Additionally, fluorided-chlorided silica-coated aluminas produced in accordance with the disclosed methods/processes are within the scope of this disclosure and are encompassed herein.

The calcining operation in the disclosed processes for producing the fluorided-chlorided silica-coated alumina activator-supports can be performed using any suitable apparatus. For example, a fluidized bed is especially convenient, operated in either a batch or continuous manner. Alternatively, the calcining can be performed in a fixed bed, or in a tray or other still container, or by a rotary calciner, or using any other suitable furnace-type equipment.

Step (a) of the process often can be referred to as the calcining step, and in the calcining step, a silica-coated alumina solid oxide can be calcined at a peak calcining temperature to produce a calcined silica-coated alumina. The calcining step can be conducted at a variety of temperatures and time periods. For instance, the calcining step can be conducted at a peak calcining temperature in a range from about 400° C. to about 1000° C.; alternatively, from about 400° C. to about 900° C.; alternatively, from about 500° C. to about 1000° C.; alternatively, from about 600° C. to about 900° C.; alternatively, from about 550° C. to about 950° C.; alternatively, from about 500° C. to about 800° C.; or alternatively, from about 600° C. to about 750° C. In these and other aspects, these temperature ranges also are meant to encompass circumstances where the calcining step is conducted at a series of different temperatures (e.g., an initial calcining temperature, a peak calcining temperature), instead of at a single fixed temperature, falling within the respective ranges. For instance, the calcining step can start at a lower initial calcining temperature, and subsequently, the temperature of the calcining step can be increased to the peak calcining temperature, for example, a peak calcining temperature in a range from about 500° C. to about 1000° C., or from about 600° C. to about 750° C.

The duration of the calcining step is not limited to any particular period of time. Hence, the calcining step can be conducted, for example, in a time period ranging from as little as 15-30 minutes to as long as 12-24 hours, or more. The appropriate calcining time can depend upon, for example, the initial/peak calcining temperature, and the atmosphere under which calcining is conducted, among other variables. Generally, however, the calcining step can be conducted in a time period that can be in a range from about 45 minutes to about 18 hours, such as, for example, from about 45 minutes to about 15 hours, from about 1 hour to about 12 hours, from about 3 hours to about 12 hours, from about 3 hours to about 10 hours, or from about 5 hours to about 10 hours.

In one aspect, calcining of the silica-coated alumina can be performed in an ambient atmosphere (e.g., an oxidizing atmosphere), for example, a dry ambient atmosphere. Hence, the calcining step can be performed in an atmosphere comprising air, a mixture of oxygen and air, a mixture of oxygen and an inert gas, and so forth. Since the calcining gas stream can comprise air, the calcining gas stream can comprise about 20-21 mole % oxygen. However, dilute oxygen calcining gas streams can be employed, such as those having less than about 15 mole %, or less than about 10 mole % oxygen. For example, suitable ranges for the mole % of oxygen in the calcining gas stream can include, but are not limited to, the following ranges: from about 0.1 to about 25 mole %, from about 1 to about 21 mole %, from about 2 to about 21 mole %, from about 1 to about 10 mole %, from about 15 to about 25 mole %, or from about 5 to about 15 mole %, and the like.

In another aspect, calcining of the silica-coated alumina solid oxide can be performed in a reducing atmosphere. The reducing atmosphere can comprise molecular hydrogen and/or carbon monoxide, either individually or in a mixture with air and/or an inert gas. In some aspects, molecular hydrogen and/or carbon monoxide can be the major component of the calcining gas stream, while in other aspects, molecular hydrogen and/or carbon monoxide can be a minor component. Any suitable amount of the reducing agent can be employed in the calcining gas stream. Accordingly, for example, the calcining gas stream can comprise (or consist essentially of, or consist of) molecular hydrogen and an inert gas (e.g., nitrogen), or alternatively, carbon monoxide and an inert gas.

In yet another aspect, calcining of the solid oxide can be performed in an inert atmosphere. Hence, the calcining gas stream can comprise (or consist essentially of, or consist of) an inert gas. The calcining gas stream can contain helium, neon, argon, or nitrogen, as well as carbon dioxide or water/steam, and the like, and this includes any combination of two or more of these materials.

The silica-coated alumina solid oxide used to produce the fluorided-chlorided silica-coated alumina activator-support can contain any relative amounts of silica and alumina, therefore, silica-coated aluminas having a majority of alumina or a majority of silica can be employed. In some aspects, the silica-coated alumina can contain silica in a weight percentage range (based on the weight of the silica-coated alumina) from about 10 to about 90 wt. % silica, from about 10 to about 80 wt. % silica, or from about 20 to about 70 wt. % silica. In other aspects, the silica content of the silica-coated alumina can be in a range from about 10 to about 65 wt. % silica, from about 20 to about 45 wt. % silica, or from about 25 to about 50 wt. % silica. Illustrative and non-limiting examples of suitable silica-coated alumina materials that can be employed herein are described in U.S. Pat. No. 7,884,163, the disclosure of which is incorporated herein by reference in its entirety.

Silica-coated aluminas generally have surface areas ranging from about 100 to about 1000 $m^2/g$. In some aspects, the surface area can fall within a range from about 150 to about 750 $m^2/g$, for example, from about 200 to about 600 $m^2/g$. The surface area of the silica-coated alumina can range from about 250 to about 500 $m^2/g$ in another aspect of this invention. Silica-coated aluminas having surface areas of about 300 $m^2/g$, about 350 $m^2/g$, about 400 $m^2/g$, or about 450 $m^2/g$, can be employed in this invention.

The pore volume of the silica-coated alumina is generally greater than about 0.5 mL/g. Often, the pore volume can be greater than about 0.75 mL/g, or greater than about 1 mL/g. In another aspect, the pore volume can be greater than about 1.2 mL/g. In yet another aspect, the pore volume can fall within a range from about 0.8 mL/g to about 2.5 mL/g, such as, for example, from about 1.2 mL/g to about 2 mL/g.

The silica-coated alumina solid oxides disclosed herein generally have average particle sizes ranging from about 10 microns to about 200 microns. In some aspects of this invention, the average particle size can fall within a range from about 25 microns to about 150 microns. For example, the average particle size of the silica-coated alumina can be in a range from about 40 to about 120 microns.

Step (b) of the process for producing a fluorided-chlorided silica-coated alumina often can be referred to as the chloriding step, and in this step, the calcined silica-coated alumina can be contacted with a chlorine-containing compound and calcined at a peak chloriding temperature to produce a chlorided silica-coated alumina. The contacting of the calcined silica-coated alumina and the chlorine-containing compound can be conducted in any suitable manner. In some aspects, the contacting of the calcined silica-coated alumina and the chlorine-containing compound can be conducted in the vapor phase, while in other aspects, the contacting of the calcined silica-coated alumina and the chlorine-containing compound can be conducted in the liquid phase. Moreover, the calcining at the peak chloriding temperature can be conducted after the calcined silica-coated alumina and the chlorine-containing compound have been contacted, or the calcining can be conducted concurrently with the contacting of the calcined silica-coated alumina and the chlorine-containing compound (e.g., in the vapor phase).

The calcining operation in the chloriding step can be conducted at a variety of temperatures and time periods. For instance, the calcining operation can be conducted at a peak chloriding temperature in a range from about 25° C. to about 700° C.; alternatively, from about 200° C. to about 700° C.; alternatively, from about 300° C. to about 700° C.; alternatively, from about 350° C. to about 650° C.; alternatively, from about 300° C. to about 600° C.; alternatively, from about 400° C. to about 650° C.; alternatively, from about 400° C. to about 600° C.; alternatively, from about 400° C. to about 550° C.; or alternatively, from about 450° C. to about 650° C. In these and other aspects, these temperature ranges also are meant to encompass circumstances where the calcining operation is conducted at a series of different temperatures (e.g., an initial chloriding temperature, a peak chloriding temperature), instead of at a single fixed temperature, falling within the respective ranges. For instance, the calcining operation in the chloriding step can start at a lower initial chloriding temperature, and subsequently, the temperature can be increased to the peak chloriding temperature, for example, in a range from about 300° C. to about 600° C., or from about 400° C. to about 600° C.

The duration of the calcining operation in the chloriding step is not limited to any particular period of time. Hence, the calcining operation can be conducted, for example, in a time period ranging from as little as 30 seconds to as long as 12-24 hours, or more. The appropriate duration of the calcining operation can depend upon, for example, the initial/peak chloriding temperature, the atmosphere under which calcining is conducted, and the amount of chlorine in the vapor stream, among other variables. Generally, however, the calcining operation can be conducted in a time period that can be in a range from about 30 seconds to about 18 hours, such as, for example, from about 1 minute to about 15 hours, from about 3 minutes to about 10 hours, from about 10 minutes to about 8 hours, from about 15 minutes to about 8 hours, from about 30 minutes to about 3 hours, or from about 1 hour to about 5 hours, and the like.

In one aspect, the calcining operation in the chloriding step can be performed in an ambient atmosphere (e.g., an oxidizing atmosphere), for example, a dry ambient atmosphere. Hence, the vapor employed in the calcining operation can comprise (or consist essentially of, or consist of) a chlorine-containing compound and air, a chlorine-containing compound and a mixture of oxygen and air, a chlorine-containing compound and mixture of oxygen and an inert gas, and so forth. In other aspects, a chlorine-containing compound is not present (e.g., the chlorine-containing compound and the calcined silica-coated alumina were contacted in the liquid phase) and, therefore, the calcining operation can be performed in an atmosphere comprising air, a mixture of oxygen and air, a mixture of oxygen and an inert gas, and so forth. Similar to the gas stream employed in the calcining step, the vapor used in the calcining operation in the chloriding step can contain any reasonable mole % of oxygen, but typical ranges can include from about 0.1 to about 25 mole %, from about 1 to about 21 mole %, from about 2 to about 21 mole %, from about 1 to about 10 mole %, from about 15 to about 25 mole %, or from about 5 to about 15 mole %, and the like. Any compositional attributes of the atmosphere under which the calcining operation in the chloriding step is conducted are meant to refer to the incoming vapor/gas stream, prior to contacting the silica-coated alumina, unless expressly stated otherwise. As one of skill in the art would readily recognize, an incoming stream containing, for example, a chlorine-containing compound and an inert gas can vary significantly in composition from the outgoing stream, after contacting the silica-coated alumina.

In another aspect, the calcining operation of the chloriding step can be performed in a reducing atmosphere. The vapor stream can comprise molecular hydrogen and/or carbon monoxide, either individually or in a mixture with air and/or an inert gas, with or without a chlorine-containing compound, depending upon the method used to contact the chlorine-containing compound and the silica-coated alumina. Similar to the gas stream employed in the calcining step, the vapor used in the calcining operation in the chloriding step can contain any reasonable amount of a reducing agent. For example, the calcining gas stream can comprise (or consist essentially of, or consist of) a chlorine-containing compound, molecular hydrogen, and an inert gas (e.g., nitrogen); alternatively, a chlorine-containing compound, carbon monoxide, and an inert gas; alternatively, molecular hydrogen and an inert gas (e.g., nitrogen); or alternatively, carbon monoxide and an inert gas.

In yet another aspect, the calcining operation of the chloriding step can be performed in an inert atmosphere. Hence, depending upon the method of contacting the chlorine-containing compound and the calcined silica-coated alumina, the vapor can comprise (or consist essentially of, or consist of) an inert gas, with or without a chlorine-containing compound. The calcining gas stream can contain helium, neon, argon, or nitrogen, as well as carbon dioxide or water/steam, and the like, and this includes any combination of two or more of these materials.

In certain aspects, the amount of the chlorine-containing compound in the vapor stream contacting the calcined silica-coated alumina can be at least about 10 ppmv (ppm by volume), at least 100 ppmv, or at least 1% by volume. In some aspects, the chlorine-containing compound can represent substantially the entire vapor stream contacting the calcined silica-coated alumina. More often, however, the amount of the chlorine-containing compound in the vapor stream contacting the chlorided silica-coated alumina can be less than about 20%, less than about 10%, or less than about 5%, by volume.

In one aspect, the chlorine-containing compound can be present in the vapor stream throughout the duration of the calcining operation. For instance, about 25 ppmv, or about 100 ppmv, of the chlorine-containing compound in a stream of dry air can be contacted with the calcined silica-coated alumina at a particular peak chloriding temperature (e.g., in the 300° C. to 600° C. range) and for a particular duration of the calcining operation in the chloriding step (e.g., in the 45 minute to 2 hour range). In another aspect, the chlorine-containing compound can be present in the vapor stream for only a portion of the duration of the calcining operation in the chloriding step, e.g., less than about 15 minutes. For instance, about 1% by volume, or about 5% by volume, of the chlorine-containing compound in a stream of dry air can be contacted with the calcined silica-coated alumina at a particular peak chloriding temperature (e.g., in the 25° C. to 700° C. range, in the 300° C. to 600° C. range, etc.) and for a particular portion of the duration of the calcining operation (e.g., 30 seconds, 1 minute, 5 minutes, 10 minutes, etc.). For the remainder of the duration of the calcining operation of the chloriding step (e.g., total of 30 min, total of 1 hour, etc.), the vapor stream can contain only the dry air. Thus, the chlorine-containing compound can be present in the vapor stream for as little as about 15-30 seconds to as long as the complete duration of the calcining operation. Often, the chlorine-containing compound can be present in the vapor stream for a period of time sufficient to result in a desired Cl loading on the calcined solid oxide, and typically, is not oversupplied above that required to retain greater than about 90-95% of the Cl on the silica-coated alumina (e.g., greater than about 98%, or 99-100%, by weight).

The chlorine-containing compound, in certain aspects, can comprise hydrochloric acid, chlorine gas ($Cl_2$), carbon tetrachloride, tetrachloroethylene, chlorobenzene, methyl chloride, methylene chloride, chloroform, allyl chloride, trichloroethylene, trichloroethanol, a chloramine, a chlorine oxide, a chlorine acid, chlorine dioxide, dichlorine monoxide, dichlorine heptoxide, chloric acid, perchloric acid, ammonium chloride, tetramethylammonium chloride, tetraethylammonium chloride, tetrapropylammonium chloride, tetrabutylammonium chloride, methyltriethylammonium chloride, silicon tetrachloride, tin tetrachloride, titanium tetrachloride, zirconium tetrachloride, aluminum trichloride, boron trichloride, or sulfur chlorides such as thionyl chloride or sulfuryl chloride, and the like, or any combination thereof. Other suitable chlorine-containing compounds can include arenes and alkyl-substituted arenes (e.g., benzene, toluene, xylene, etc.), where at least one hydrogen atom is replaced with a Cl atom.

In another aspect, the chlorine-containing compound can comprise (or consist essentially of, or consist of) hydrochloric acid; alternatively, chlorine gas ($Cl_2$); alternatively, carbon tetrachloride; alternatively, tetrachloroethylene; alternatively, chlorobenzene; alternatively, methyl chloride; alternatively, methylene chloride; alternatively, chloroform; alternatively, allyl chloride; alternatively, trichloroethylene; alternatively, trichloroethanol; alternatively, a chloramine; alternatively, a chlorine oxide; alternatively, a chlorine acid; alternatively, chlorine dioxide; alternatively, dichlorine monoxide; alternatively, dichlorine heptoxide; alternatively, chloric acid; alternatively, perchloric acid; alternatively, ammonium chloride; alternatively, tetramethylammonium chloride; alternatively, tetraethylammonium chloride; alternatively, tetrapropylammonium chloride; alternatively, tetrabutylammonium chloride; or alternatively, methyltriethylammonium chloride. In other aspects, the chlorine-containing compound can comprise hydrogen chloride (HCl), ammonium chloride ($NH_4Cl$), $SiCl_4$, $SiMe_2Cl_2$, $TiCl_4$, $BCl_3$, and the like, as well as mixtures or combinations thereof. Hence, the chlorine-containing compound can comprise (or consist essentially of, or consist of) hydrogen chloride (HCl); alternatively, ammonium chloride ($NH_4Cl$); alternatively, $SiCl_4$; alternatively, $SiMe_2Cl_2$; alternatively, $TiCl_4$; or alternatively, $BCl_3$.

In a "vapor" phase preparation, one or more of these chlorine-containing compounds can be contacted with the calcined silica-coated alumina during the calcining operation; for example, a suitable chlorine-containing compound can be vaporized into a gas stream used to fluidize the calcined silica-coated alumina during the calcination operation. In a "liquid" phase preparation, one or more of these chlorine-containing compounds can be mixed with a slurry of the calcined silica-coated alumina in a suitable solvent (e.g., water, $C_1$-$C_3$ alcohols, etc.), followed by (drying, if desired, and) subsequent calcining. In another "liquid" phase preparation, the calcined silica-coated alumina can be treated with a hydrocarbon solution of one or more of these chlorine-containing compounds (e.g., silicon tetrachloride, thionyl chloride, etc.), followed by evaporation of the hydrocarbon (if desired), and subsequent calcining. Other suitable procedures are well known to those of skill in the art.

Step (c) of the process for producing a fluorided-chlorided silica-coated alumina often can be referred to as the fluoriding step, and in this step, the chlorided silica-coated alumina can be contacted with a fluorine-containing compound and calcined at a peak fluoriding temperature to produce the fluorided-chlorided silica-coated alumina. The contacting of the chlorided silica-coated alumina and the fluorine-containing compound can be conducted in any suitable manner. In some aspects, the contacting of the chlorided silica-coated alumina and the fluorine-containing compound can be conducted in the vapor phase, while in other aspects, the contacting of the chlorided silica-coated alumina and the fluorine-containing compound can be conducted in the liquid phase. Moreover, the calcining at the peak fluoriding temperature can be conducted after the chlorided silica-coated alumina and the fluorine-containing compound have been contacted, or the calcining can be conducted concurrently with the contacting of the chlorided silica-coated alumina and the fluorine-containing compound (e.g., in the vapor phase).

The calcining operation in the fluoriding step can be conducted at a variety of temperatures and time periods. For instance, the calcining operation in the fluoriding step can be conducted at a peak fluoriding temperature in a range from about 25° C. to about 700° C.; alternatively, from about 200° C. to about 700° C.; alternatively, from about 300° C. to about 700° C.; alternatively, from about 350° C. to about 650° C.; alternatively, from about 300° C. to about 600° C.; alternatively, from about 400° C. to about 650° C.; alternatively, from about 400° C. to about 600° C.; alternatively, from about 400° C. to about 550° C.; or alternatively, from about 450° C. to about 650° C. In these and other aspects, these temperature ranges also are meant to encompass circumstances where the calcining operation in the fluoriding step is conducted at a series of different temperatures (e.g., an initial fluoriding temperature, a peak fluoriding temperature), instead of at a single fixed temperature, falling within the respective ranges.

For instance, the calcining operation in the fluoriding step can start at a lower initial fluoriding temperature, and subsequently, the temperature can be increased to the peak fluoriding temperature, for example, in a range from about 300° C. to about 600° C., or from about 400° C. to about 600° C.

The duration of the calcining operation in the fluoriding step is not limited to any particular period of time. Hence, the calcining operation can be conducted, for example, in a time period ranging from as little as 30 seconds to as long as 12-24 hours, or more. The appropriate duration of the calcining operation in the fluoriding step can depend upon, for example, the initial/peak fluoriding temperature, the atmosphere under which calcining is conducted, and the amount of fluorine in the vapor stream, among other variables. Generally, however, the calcining operation in the fluoriding step can be conducted in a time period that can be in a range from about 30 seconds to about 18 hours, such as, for example, from about 1 minute to about 15 hours, from about 3 minutes to about 10 hours, from about 10 minutes to about 8 hours, from about 15 minutes to about 8 hours, from about 30 minutes to about 3 hours, or from about 1 hour to about 5 hours, and the like.

In one aspect, the calcining operation in the fluoriding step can be performed in an ambient atmosphere (e.g., an oxidizing atmosphere), for example, a dry ambient atmosphere. Hence, the vapor employed in the calcining operation can comprise (or consist essentially of, or consist of) a fluorine-containing compound and air, a fluorine-containing compound and a mixture of oxygen and air, a fluorine-containing compound and a mixture of oxygen and an inert gas, and so forth. In other aspects, a fluorine-containing compound is not present (e.g., the fluorine-containing compound and the chlorided silica-coated alumina were contacted in the liquid phase) and, therefore, the calcining operation can be performed in an atmosphere comprising air, a mixture of oxygen and air, a mixture of oxygen and an inert gas, and so forth. Similar to the gas stream employed in the calcining step, the vapor used in the calcining operation in the fluoriding step can contain any reasonable mole % of oxygen, but typical ranges can include from about 0.1 to about 25 mole %, from about 1 to about 21 mole %, from about 2 to about 21 mole %, from about 1 to about 10 mole %, from about 15 to about 25 mole %, or from about 5 to about 15 mole %, and the like. Any compositional attributes of the atmosphere under which the calcining operation in the fluoriding step is conducted are meant to refer to the incoming vapor/gas stream, prior to contacting the chlorided silica-coated alumina, unless expressly stated otherwise. As one of skill in the art would readily recognize, an incoming stream containing, for example, a fluorine-containing compound and an inert gas can vary significantly in composition from the outgoing stream, after contacting the chlorided silica-coated alumina.

In another aspect, the calcining operation of the fluoriding step can be performed in a reducing atmosphere. The vapor stream can comprise molecular hydrogen and/or carbon monoxide, either individually or in a mixture with air and/or an inert gas, with or without a fluorine-containing compound, depending upon the method used to contact the fluorine-containing compound and the chlorided silica-coated alumina. Similar to the gas stream employed in the calcining step, the vapor used in the calcining operation in the fluoriding step can contain any reasonable amount of a reducing agent. For example, the calcining gas stream can comprise (or consist essentially of, or consist of) a fluorine-containing compound, molecular hydrogen, and an inert gas (e.g., nitrogen); alternatively, a fluorine-containing compound, carbon monoxide, and an inert gas; alternatively, molecular hydrogen and an inert gas (e.g., nitrogen); or alternatively, carbon monoxide and an inert gas.

In yet another aspect, the calcining operation of the fluoriding step can be performed in an inert atmosphere. Hence, depending upon the method of contacting the fluorine-containing compound and the chlorided silica-coated alumina, the vapor can comprise (or consist essentially of, or consist of) an inert gas, with or without a fluorine-containing compound. The calcining gas stream can contain helium, neon, argon, or nitrogen, as well as carbon dioxide or water/steam, and the like, and this includes any combination of two or more of these materials.

In certain aspects, the amount of the fluorine-containing compound in the vapor stream contacting the chlorided silica-coated alumina can be at least about 10 ppmv (ppm by volume), at least 100 ppmv, or at least 1% by volume. In some aspects, the fluorine-containing compound can represent substantially the entire vapor stream contacting the chlorided silica-coated alumina. More often, however, the amount of the fluorine-containing compound in the vapor stream contacting the chlorided silica-coated alumina can be less than about 20%, less than about 10%, or less than about 5%, by volume.

In one aspect, the fluorine-containing compound can be present in the vapor stream throughout the duration of the calcining operation. For instance, about 25 ppmv, or about 100 ppmv, of the fluorine-containing compound in a stream of dry air can be contacted with the chlorided silica-coated alumina at a particular peak fluoriding temperature (e.g., in the 25° C. to 700° C. range, in the 300° C. to 600° C. range) and for a particular duration of the calcining operation of the fluoriding step (e.g., in the 45 minute to 2 hour range). In another aspect, the fluorine-containing compound can be present in the vapor stream for only a portion of the duration of the calcining operation in the fluoriding step, e.g., less than about 15 minutes. For instance, about 1% by volume, or about 5% by volume, of the fluorine-containing compound in a stream of dry air can be contacted with the chlorided silica-coated alumina at a particular peak fluoriding temperature (e.g., in the 300° C. to 600° C. range) and for a particular portion of the duration of the calcining operation (e.g., 30 seconds, 1 minute, 5 minutes, 10 minutes, etc.). For the remainder of the duration of the calcining operation of the fluoriding step (e.g., total of 30 min, total of 1 hour, etc.), the vapor stream can contain only the dry air. Thus, the fluorine-containing compound can be present in the vapor stream for as little as about 15-30 seconds to as long as the complete duration of the calcining operation. Often, the fluorine-containing compound can be present in the vapor stream for a period of time sufficient to result in a desired F loading on the chlorided solid oxide, and typically, is not oversupplied above that required to retain greater than about 90-95% of the F on the chlorided silica-coated alumina (e.g., greater than about 98%, or 99-100%, by weight).

The fluorine-containing compound, in certain aspects, can comprise (i) a fluoroalkane or fluoroalkene of the formula CxHyFz, wherein x is an integer from 1 to 8, y and z are integers such that y+z=2x+n, and wherein n is 0, 1, or 2; (ii) a fluoroaromatic compound (e.g., benzene, toluene, xylene, etc.), wherein at least one hydrogen atom is replaced with a F atom; or (iii) an alkyl or alkenyl ether wherein at least one alkyl or alkenyl group has a hydrogen atom replaced with a F atom; or any combination thereof.

In other aspects, the fluorine-containing compound can comprise a Freon or a fluorocarbon compound. For instance, suitable fluorine-containing compounds can include, but are not limited to, tetrafluoromethane, trifluoromethane, difluoromethane, fluoromethane, hexafluoroethane, pentafluoroethane, pentafluorodimethyl ether, 1,1,2,2-tetrafluoroethane, 1,1,1,2-tetrafluoroethane, bis(difluoromethyl)ether, 1,1,2-trifluoroethane, 1,1,1-trifluoroethane, methyl trifluoromethyl ether, 2,2,2-trifluoroethyl methyl ether, 1,2-difluoroethane, 1,1-difluoroethane, fluoroethane, octafluoropropane, 1,1,2,2,3,3,3-heptafluoropropane, trifluoromethyl 1,1,2,2-tetrafluoroethyl ether, 1,1,1,2,3,3,3-heptafluoropropane, trifluoromethyl 1,2,2,2-tetrafluoroethyl ether, 1,1,1,2,2,3-hexafluoropropane, 1,1,1,2,3,3-hexafluoropropane, 1,1,1,3,3,3-hexafluoropropane, 1,2,2,2-tetrafluoroethyl difluoromethyl ether, hexafluoropropane, pentafluoropropane, 1,1,2,2,3-pentafluoropropane, 1,1,2,3,3-pentafluoropropane, 1,1,1,2,3-pentafluoropropane, 1,1,1,3,3-pentafluoropropane, methyl pentafluoroethyl ether, difluoromethyl 2,2,2-trifluoroethyl ether, difluoromethyl 1,1,2-trifluoroethyl ether, 1,1,2,2-tetrafluoropropane, methyl 1,1,2,2-tetrafluoroethyl ether, trifluoropropane, difluoropropane, fluoropropane, octafluorocyclobutane, decafluorobutane, 1,1,1,2,2,3,3,4,4-nonafluorobutane, 1,1,1,2,3,4,4,4-octafluorobutane, 1,1,1,2,2,3,3-heptafluorobutane, perfluoropropyl methyl ether, perfluoroisopropyl methyl ether, 1,1,1,3,3-pentafluorobutane, perfluorohexane (tetradecafluorohexane), tetrafluoroethylene, 1,1-difluoroethylene, fluoroethylene, hexafluoropropylene, 2,3,3,3-tetrafluoropropene, hexafluoropropene trimer, and the like, as well as combinations thereof.

In another aspect, the fluorine-containing compound can comprise (or consist essentially of, or consist of) tetrafluoromethane, trifluoromethane, difluoromethane, fluoromethane, hexafluoroethane, pentafluoroethane, tetrafluoroethane, trifluoroethane, difluorethane, octafluoropropane, perfluorohexane, perfluorobenzene, pentafluorodimethyl ether, bis(difluoromethyl)ether, methyl trifluoromethyl ether, trifluoroethyl methyl ether, perfluoroacetic anhydride, trifluoroethanol, silicon tetrafluoride ($SiF_4$), hydrogen fluoride (HF), fluorine gas ($F_2$), boron trifluoride ($BF_3$), triflic acid, tetrafluoroboric acid, antimony pentafluoride, phosphorous pentafluoride, tin tetrafluoride, thionyl fluoride, or sulfur hexafluoride, and the like, as well as mixtures or combinations thereof. For instance, the fluorine-containing compound can comprise (or consist essentially of, or consist of) tetrafluoromethane; alternatively, trifluoromethane; alternatively, difluoromethane; alternatively, fluoromethane; alternatively, hexafluoroethane; alternatively, pentafluoroethane; alternatively, tetrafluoroethane; alternatively, trifluoroethane; alternatively, difluorethane; alternatively, octafluoropropane; alternatively, perfluorohexane; alternatively, perfluorobenzene; alternatively, pentafluorodimethyl ether; alternatively, bis(difluoromethyl)ether; alternatively, methyl trifluoromethyl ether; alternatively, trifluoroethyl methyl ether; alternatively, perfluoroacetic anhydride; alternatively, trifluoroethanol; alternatively, silicon tetrafluoride; alternatively, hydrogen fluoride; or alternatively, fluorine gas.

In yet another aspect, the fluorine-containing compound can comprise tetrafluoroethane, perfluorohexane, perfluoroacetic anhydride, and the like, or any combination thereof. In still another aspect, the fluorine-containing compound can comprise tetrafluoroethane, or alternatively, the fluorine-containing compound can comprise perfluorohexane.

In other aspects, the fluorine-containing compound can comprise hydrogen fluoride (HF), ammonium fluoride ($NH_4F$), ammonium bifluoride ($NH_4HF_2$), ammonium tetrafluoroborate ($NH_4BF_4$), ammonium silicofluoride (hexafluorosilicate) (($NH_4)_2SiF_6$), ammonium hexafluorophosphate ($NH_4PF_6$), hexafluorotitanic acid ($H_2TiF_6$), ammonium hexafluorotitanic acid ($(NH_4)_2TiF_6$), hexafluorozirconic acid ($H_2ZrF_6$), $AlF_3$, $NH_4AlF_4$, triflic acid, ammonium triflate, and the like, as well as mixtures or combinations thereof. Hence, the fluorine-containing compound can comprise (or consist essentially of, or consist of) hydrogen fluoride (HF); alternatively, ammonium fluoride ($NH_4F$); alternatively, ammonium bifluoride ($NH_4HF_2$); alternatively, ammonium tetrafluoroborate ($NH_4BF_4$); alternatively, ammonium silicofluoride (hexafluorosilicate) (($NH_4)_2SiF_6$); alternatively, ammonium hexafluorophosphate ($NH_4PF_6$); alternatively, hexafluorotitanic acid ($H_2TiF_6$); alternatively, ammonium hexafluorotitanic acid (($NH_4)_2TiF_6$); alternatively, hexafluorozirconic acid ($H_2ZrF_6$); alternatively, $AlF_3$; alternatively, $NH_4AlF_4$; alternatively, triflic acid; or alternatively, ammonium triflate.

In a "vapor" phase preparation, one or more of these fluorine-containing compounds can be contacted with the chlorided silica-coated alumina during the calcining operation; for example, a suitable fluorine-containing compound can be vaporized into a gas stream used to fluidize the chlorided silica-coated alumina during calcination. In another "vapor" phase preparation, the chlorided silica-coated alumina can be exposed to a reactive fluoriding agent vapor at room temperature or slightly higher (e.g., suitable fluorine-containing compounds include HF, $BF_3$, $SiF_4$, thionyl fluoride, etc.), followed by subsequent calcining. In yet another "vapor" phase preparation, a suitable fluorine-containing compound (e.g., ammonium tetrafluoroborate, ammonium hexafluorosilicate, etc.) can be dry-mixed with the chlorided silica-coated alumina, and then heated to decompose the fluorine-containing compound, releasing fluorine-containing vapors, which react with the support. The decomposition and concurrent/subsequent calcining often can occur in the 100° C. to 700° C. range, in the 150° C. to 700° C. range, and the like. In a "liquid" phase preparation, one or more of these fluorine-containing compounds (e.g., ammonium tetrafluoroborate, ammonium hexafluorosilicate, ammonium bifluoride, hydrofluoric acid, triflic acid, etc.) can be mixed with a slurry of the chlorided silica-coated alumina in a suitable solvent (e.g., water, $C_1$-$C_3$ alcohols, etc.), followed by (drying, if desired, and) subsequent calcining. Other suitable procedures are well known to those of skill in the art.

The fluorided-chlorided silica-coated alumina generally can contain from about 1 to about 20 wt. % fluorine (F), based on the total weight of the fluorided-chlorided silica-coated alumina. In particular aspects provided herein, the fluorided-chlorided silica-coated alumina can contain from about 2 to about 15 wt. % fluorine, from about 3 to about 10 wt. % fluorine, from about 4 to about 12 wt. % fluorine, from about 5 to about 12 wt. % fluorine, from about 5 to about 10 wt. % fluorine, or from about 4 to about 9 wt. % fluorine, based on the total weight of the fluorided-chlorided silica-coated alumina.

The fluorided-chlorided silica-coated alumina generally can contain from about 0.1 to about 20 wt. % chlorine (Cl), based on the total weight of the fluorided-chlorided silica-coated alumina. In particular aspects provided herein, the fluorided-chlorided silica-coated alumina can contain from about 0.5 to about 15 wt. % chlorine, from about 1 to about 10 wt. % chlorine, from about 1 to about 12 wt. % chlorine, from about 2 to about 12 wt. % chlorine, from about 2 to about 7 wt. % chlorine, or from about 2 to about 6 wt. % chlorine, based on the total weight of the fluorided-chlorided silica-coated alumina.

Optionally, the fluorided-chlorided silica-coated alumina can be impregnated with a metal, such as a transition metal, at any stage within the process, as well as pre-impregnating the silica-coated alumina, or post-impregnating the fluorided-chlorided silica-coated alumina, using various techniques and methods known to those of skill in the art. The metal can be a transition metal from Groups 3 to 11 of the periodic table, such as titanium, zirconium, hafnium, vanadium, molybdenum, tungsten, iron, cobalt, nickel, copper, scandium, yttrium, lanthanum, and the like, or combinations thereof. For instance, the fluorided-chlorided silica-coated alumina can be impregnated with titanium, zirconium, hafnium, vanadium, nickel, and the like, either singly or in combination. If employed, the weight percentage of the transition metal in the fluorided-chlorided silica-coated alumina, based on the total weight of the metal-containing fluorided-chlorided silica-coated alumina, often can be in a range from about 0.01 to about 10 wt. %, from about 0.1 to about 9 wt. %, from about 0.1 to about 5 wt. %, from about 0.1 to about 3 wt. %, or from about 0.3 to about 2 wt. %.

In various aspects contemplated herein, the processes for producing a fluorided-chlorided silica-coated alumina can be performed with a higher temperature calcining step (a higher peak calcining temperature), followed by chloriding and fluoriding steps which are conducted at temperatures equal to or less than the peak calcining temperature. Hence, in some aspects, the peak chloriding temperature and/or the peak fluoriding temperature can be less than or equal to the peak calcining temperature. While not wishing to be bound by theory, applicants believe that calcining the silica-coated alumina first at a higher temperature, followed by a lower temperature (or equal temperature) chloridation step and/or fluoridation step can result in a fluorided-chlorided silica-coated alumina with higher resultant catalyst activity (e.g., the fluorided-chlorided silica-coated alumina also may have higher surface area and/or pore volume and/or acidity as a result of this treatment). Therefore, in one aspect of this invention, the peak chloriding temperature and/or the peak fluoriding temperature can be less than the peak calcining temperature, for example, at least about 10° C., at least about 25° C., at least about 50° C., at least about 75° C., or at least about 100° C., less than the peak calcining temperature. In another aspect, the peak chloriding temperature and/or the peak fluoriding temperature can be from 0° C. to about 600° C. less than the peak calcining temperature, or from about 25° C. to about 600° C. less than the peak calcining temperature. In still another aspect, the peak chloriding temperature and/or the peak fluoriding temperature can be from 0° C. to about 400° C., from 0° C. to about 300° C., from about 25° C. to about 400° C., from about 25° C. to about 300° C., from about 50° C. to about 400° C., from about 60° C. to about 300° C., from about 75° C. to about 400° C., from about 75° C. to about 300° C., from about 85° C. to about 250° C., from about 100° C. to about 500° C., from about 100° C. to about 400° C., or from about 100° C. to about 250° C., less than the peak calcining temperature. For instance, representative and non-limiting examples of the peak calcining temperature and the peak chloriding and/or the peak fluoriding temperature can include the following: a peak calcining temperature of 500° C. and a peak chloriding and/or fluoriding temperature of 500° C., a peak calcining temperature of 600° C. and a peak chloriding and/or fluoriding temperature of 600° C., a peak calcining temperature of 600° C. and a peak chloriding and/or fluoriding temperature of 500° C., a peak calcining temperature of 800° C. and a peak chloriding and/or fluoriding temperature of 500° C., a peak calcining temperature of 900° C. and a peak chloriding and/or fluoriding temperature of 500° C., a peak calcining temperature of 750° C. and a peak chloriding and/or fluoriding temperature of 600° C., a peak calcining temperature of 700° C. and a peak chloriding and/or fluoriding temperature of 550° C., a peak calcining temperature of 600° C. and a peak chloriding and/or fluoriding temperature of 450° C., and the like.

Fluorided-chlorided silica-coated aluminas of the present invention generally can have surface areas (e.g., determined using the BET method) of at least about 150 m²/g, and more often, at least about 200 m²/g. For instance, fluorided-chlorided silica-coated aluminas having surface areas over 250 m²/g, over 300 m²/g, or over 350 m²/g, can be produced using the processes disclosed herein. Typical ranges of surface area for the fluorided-chlorided silica-coated alumina can include, but are not limited to, the following: from about 250 to about 1000 m²/g, from about 300 to about 1000 m²/g, from about 150 to about 700 m²/g, from about 200 to about 700 m²/g, from about 250 to about 500 m²/g, or from about 275 to about 700 m²/g, and the like.

Fluorided-chlorided silica-coated aluminas of the present invention generally can have pore volumes (e.g. using the t-plot method) of at least about 0.5 mL/g, and more often, at least about 0.9 mL/g. For instance, fluorided-chlorided silica-coated aluminas having pore volumes over 1 mL/g, over 1.1 mL/g, or over 1.2 mL/g, can be produced using the processes disclosed herein. Typical ranges of pore volume for the fluorided-chlorided silica-coated alumina can include, but are not limited to, the following ranges: from about 0.5 to about 2.5 mL/g, from about 0.9 to about 2 mL/g, from about 1.2 to about 2.2 mL/g, from about 0.9 to about 1.8 mL/g, or from about 1 to about 1.5 mL/g, and the like.

Fluorided-chlorided silica-coated aluminas disclosed herein generally can have average particle sizes ranging from about 10 microns to about 200 microns. In some aspects of this invention, the average particle size can fall within a range from about 25 microns to about 150 microns. For example, the average particle size of the fluorided-chlorided silica-coated alumina can be in a range from about 40 to about 120 microns.

In various aspects contemplated herein, the processes for producing fluorided-chlorided silica-coated aluminas can further include one or more optional steps performed prior to the calcination step, and/or one or more optional intermediate steps performed after the calcination step but before the chloriding step, and/or one or more optional intermediate steps performed after the chloriding step but before the fluoriding step, and/or one or more optional steps performed after the fluoriding step. As a non-limiting example, a purging step can be performed after the calcination step, and this purging step can comprise contacting the calcined silica-coated alumina with a purging stream comprising (or consisting essentially of, or consisting of) an inert gas, such as helium, neon, argon, or nitrogen, or a mixture thereof. The purging step can be performed at the peak calcining temperature, at ambient temperature, and/or used to transition from the peak calcining temperature to ambient temperature, as well as other suitable temperatures. As another non-limiting example, a storage step can be performed after the fluoriding step, and this storage step can comprise contacting the fluorided-chlorided silica-coated alumina with a storage gas stream comprising (or consisting essentially of, or consisting of) an inert gas, such as helium, neon, argon, or nitrogen, or a mixture thereof. The storage step can be performed while cooling from the peak fluoriding temperature to ambient temperature and/or during storage of the fluorided-chlorided silica-coated alumina prior to its use in a catalyst system, for example.

Co-Catalysts

In certain aspects directed to catalyst compositions containing a co-catalyst, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth. The hydrocarbyl group (or alkyl group) can be any hydrocarbyl (or alkyl) group disclosed herein. Moreover, in some aspects, the metal of the metal hydrocarbyl can be a group 1, 2, 11, 12, 13, or 14 metal; alternatively, a group 13 or 14 metal; or alternatively, a group 13 metal. Hence, in some aspects, the metal of the metal hydrocarbyl (non-halide metal hydrocarbyl or metal hydrocarbyl halide) can be lithium, sodium, potassium, rubidium, cesium, beryllium, magnesium, calcium, strontium, barium, zinc, cadmium, boron, aluminum, or tin; alternatively, lithium, sodium, potassium, magnesium, calcium, zinc, boron, aluminum, or tin; alternatively, lithium, sodium, or potassium; alternatively, magnesium or calcium; alternatively, lithium; alternatively, sodium; alternatively, potassium; alternatively, magnesium; alternatively, calcium; alternatively, zinc; alternatively, boron; alternatively, aluminum; or alternatively, tin. In some aspects, the metal hydrocarbyl or metal alkyl, with or without a halide, can comprise a lithium hydrocarbyl or alkyl, a magnesium hydrocarbyl or alkyl, a boron hydrocarbyl or alkyl, a zinc hydrocarbyl or alkyl, or an aluminum hydrocarbyl or alkyl.

In particular aspects directed to catalyst compositions containing an activator-support comprising a fluorided-chlorided silica-coated alumina, the co-catalyst can comprise an aluminoxane compound, an organoboron or organoborate compound, an ionizing ionic compound, an organoaluminum compound, an organozinc compound, an organomagnesium compound, or an organolithium compound, and this includes any combinations of these materials. In one aspect, the co-catalyst can comprise an organoaluminum compound. In another aspect, the co-catalyst can comprise an aluminoxane compound, an organoboron or organoborate compound, an ionizing ionic compound, an organozinc compound, an organomagnesium compound, an organolithium compound, or any combination thereof. In yet another aspect, the co-catalyst can comprise an aluminoxane compound; alternatively, an organoboron or organoborate compound; alternatively, an ionizing ionic compound; alternatively, an organozinc compound; alternatively, an organomagnesium compound; or alternatively, an organolithium compound.

Organoaluminum Compounds

In some aspects, catalyst compositions of the present invention can comprise one or more organoaluminum compounds. Such compounds can include, but are not limited to, compounds having the formula:

where each $R^Z$ independently can be an aliphatic group having from 1 to 10 carbon atoms. For example, each $R^Z$ independently can be methyl, ethyl, propyl, butyl, hexyl, or isobutyl.

Other organoaluminum compounds which can be used in catalyst compositions disclosed herein can include, but are not limited to, compounds having the formula:

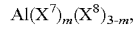

where each $X^7$ independently can be a hydrocarbyl; each $X^8$ independently can be an alkoxide or an aryloxide, a halide, or a hydride; and m can be from 1 to 3, inclusive. Hydrocarbyl is used herein to specify a hydrocarbon radical group and includes, for instance, aryl, alkyl, cycloalkyl, alkenyl, cycloalkenyl, cycloalkadienyl, alkynyl, aralkyl, aralkenyl, and aralkynyl groups.

In one aspect, each $X^7$ independently can be any hydrocarbyl having from 1 to about 18 carbon atoms disclosed herein.

In another aspect of the present invention, each $X^7$ independently can be any alkyl having from 1 to 10 carbon atoms disclosed herein. For example, each $X^7$ independently can be methyl, ethyl, propyl, n-butyl, sec-butyl, isobutyl, or hexyl, and the like, in yet another aspect of the present invention.

According to one aspect of the present invention, each $X^8$ independently can be an alkoxide or an aryloxide, any one of which has from 1 to 18 carbon atoms, a halide, or a hydride. In another aspect of the present invention, each $X^8$ can be selected independently from fluorine and chlorine. Yet, in another aspect, $X^8$ can be chlorine.

In the formula, $Al(X^7)_m(X^8)_{3-m}$, m can be a number from 1 to 3, inclusive, and typically, m can be 3. The value of m is not restricted to be an integer; therefore, this formula can include sesquihalide compounds or other organoaluminum cluster compounds.

Examples of organoaluminum compounds suitable for use in accordance with the present invention can include, but are not limited to, trialkylaluminum compounds, dialkylaluminum halide compounds, dialkylaluminum alkoxide compounds, dialkylaluminum hydride compounds, and combinations thereof. Specific non-limiting examples of suitable organoaluminum compounds can include trimethylaluminum (TMA), triethylaluminum (TEA), tri-n-propylaluminum (TNPA), tri-n-butylaluminum (TNBA), triisobutylaluminum (TIBA), tri-n-hexylaluminum, tri-n-octylaluminum, diisobutylaluminum hydride, diethylaluminum ethoxide, diethylaluminum chloride, and the like, or combinations thereof.

The present invention contemplates a method of precontacting a metallocene compound (or compounds) with an organoaluminum compound and an olefin monomer to form a precontacted mixture, prior to contacting this precontacted mixture with the activator-support to form a catalyst composition. When the catalyst composition is prepared in this manner, typically, though not necessarily, a portion of the organoaluminum compound can be added to the precontacted mixture and another portion of the organoaluminum compound can be added to the postcontacted mixture prepared when the precontacted mixture is contacted with the solid oxide activator-support. However, the entire organoaluminum compound can be used to prepare the catalyst composition in either the precontacting or postcontacting step. Alternatively, all the catalyst components can be contacted in a single step.

Further, more than one organoaluminum compound can be used in either the precontacting or the postcontacting step. When an organoaluminum compound is added in multiple steps, the amounts of organoaluminum compound disclosed herein include the total amount of organoaluminum compound used in both the precontacted and postcontacted mixtures, and any additional organoaluminum compound added to the polymerization reactor. Therefore, total amounts of organoaluminum compounds are disclosed regardless of whether a single organoaluminum compound or more than one organoaluminum compound is used.

Aluminoxane Compounds

Certain aspects of the present invention provide a catalyst composition which can comprise an aluminoxane compound. As used herein, the terms "aluminoxane" and "aluminoxane compound" refer to aluminoxane compounds, compositions, mixtures, or discrete species, regardless of how such aluminoxanes are prepared, formed or otherwise provided. For example, a catalyst composition comprising an aluminoxane compound can be prepared in which aluminoxane is provided as the poly(hydrocarbyl aluminum oxide), or in which aluminoxane is provided as the combination of an aluminum alkyl compound and a source of active protons such as water. Aluminoxanes also can be referred to as poly(hydrocarbyl aluminum oxides) or organoaluminoxanes.

The other catalyst components typically can be contacted with the aluminoxane in a saturated hydrocarbon compound solvent, though any solvent that is substantially inert to the reactants, intermediates, and products of the activation step can be used. The catalyst composition formed in this manner can be collected by any suitable method, for example, by filtration. Alternatively, the catalyst composition can be introduced into the polymerization reactor without being isolated.

The aluminoxane compound of this invention can be an oligomeric aluminum compound comprising linear structures, cyclic structures, or cage structures, or mixtures of all three. Cyclic aluminoxane compounds having the formula:

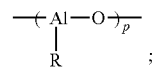

wherein each R in this formula independently can be a linear or branched alkyl having from 1 to 10 carbon atoms, and p in this formula can be an integer from 3 to 20, are encompassed by this invention. The AlRO moiety shown here also can constitute the repeating unit in a linear aluminoxane. Thus, linear aluminoxanes having the formula:

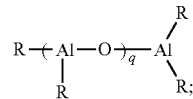

wherein each R in this formula independently can be a linear or branched alkyl having from 1 to 10 carbon atoms, and q in this formula can be an integer from 1 to 50, are also encompassed by this invention.

Further, aluminoxanes can have cage structures of the formula $R^t_{5r+\alpha}R^b_{r-\alpha}Al_{4r}O_{3r}$, wherein each $R^t$ independently can be a terminal linear or branched alkyl group having from 1 to 10 carbon atoms; each Rb independently can be a bridging linear or branched alkyl group having from 1 to 10 carbon atoms; r can be 3 or 4; and $\alpha$ can be equal to $n_{Al(3)} - n_{O(2)} + n_{O(4)}$, wherein $n_{Al(3)}$ is the number of three coordinate aluminum atoms, $n_{O(2)}$ is the number of two coordinate oxygen atoms, and $n_{O(4)}$ is the number of 4 coordinate oxygen atoms.

Thus, aluminoxanes which can be employed in the catalyst compositions of the present invention can be represented generally by formulas such as $(R-Al-O)_p$, $R(R-Al-O)_q$ $AlR_2$, and the like. In these formulas, each R group independently can be a linear or branched $C_1$-$C_6$ alkyl, such as methyl, ethyl, propyl, butyl, pentyl, or hexyl. Examples of aluminoxane compounds that can be used in accordance with the present invention can include, but are not limited to, methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentyl-aluminoxane, 2-pentylaluminoxane, 3-pentylaluminoxane, isopentylaluminoxane, neopentylaluminoxane, and the like, or any combination thereof. Methylaluminoxane, ethylaluminoxane, and iso-butylaluminoxane can be prepared from trimethylaluminum, triethylaluminum, and triisobutylaluminum, respectively, and sometimes are referred to as poly(methyl aluminum oxide), poly(ethyl aluminum oxide), and poly(isobutyl aluminum oxide), respectively. It is also within the scope of the invention to use an aluminoxane in combination with a trialkylaluminum, such as that disclosed in U.S. Pat. No. 4,794,096, incorporated herein by reference in its entirety.

The present invention contemplates many values of p and q in the aluminoxane formulas $(R-Al-O)_p$ and $R(R-Al-O)_qAlR_2$, respectively. In some aspects, p and q can be at least 3. However, depending upon how the organoaluminoxane is prepared, stored, and used, the value of p and q can vary within a single sample of aluminoxane, and such combinations of organoaluminoxanes are contemplated herein.

In preparing a catalyst composition containing an aluminoxane, the molar ratio of the total moles of aluminum in the aluminoxane (or aluminoxanes) to the total moles of metallocene complex(es) in the composition generally can be between about 1:10 and about 100,000:1. In another aspect, the molar ratio can be in a range from about 5:1 to about 15,000:1. Optionally, aluminoxane can be added to a polymerization reactor system in ranges from about 0.01 mg/L to about 1000 mg/L, from about 0.1 mg/L to about 100 mg/L, or from about 1 mg/L to about 50 mg/L.

Organoaluminoxanes can be prepared by various procedures. Examples of organoaluminoxane preparations are disclosed in U.S. Pat. Nos. 3,242,099 and 4,808,561, the disclosures of which are incorporated herein by reference in their entirety. For example, water in an inert organic solvent can be reacted with an aluminum alkyl compound, such as $(R^Z)_3Al$, to form the desired organoaluminoxane compound. While not intending to be bound by this statement, it is believed that this synthetic method can afford a mixture of both linear and cyclic R—Al—O aluminoxane species, both of which are encompassed by this invention. Alternatively, organoaluminoxanes can be prepared by reacting an aluminum alkyl compound, such as $(R^Z)_3Al$, with a hydrated salt, such as hydrated copper sulfate, in an inert organic solvent.

Organoboron & Organoborate Compounds

According to another aspect of the present invention, the catalyst composition can comprise an organoboron or organoborate compound. Such compounds can include neutral boron compounds, borate salts, and the like, or combinations thereof. For example, fluoroorgano boron compounds and fluoroorgano borate compounds are contemplated.

Any fluoroorgano boron or fluoroorgano borate compound can be utilized with the present invention. Examples of fluoroorgano borate compounds that can be used in the present invention can include, but are not limited to, fluorinated aryl borates such as N,N-dimethylanilinium tetrakis(pentafluorophenyl)borate, triphenylcarbenium tetrakis(pentafluorophenyl)borate, lithium tetrakis(pentafluorophenyl)borate, N,N-dimethylanilinium tetrakis[3,5-bis(trifluoromethyl)phenyl]borate, triphenylcarbenium tetrakis[3,5-bis(trifluoromethyl)phenyl]borate, and the like, or mixtures thereof. Examples of fluoroorgano boron compounds that can be used as co-catalysts in the present invention can include, but are not limited to, tris(pentafluorophenyl)boron, tris[3,5-bis(trifluoromethyl)phenyl]boron, and the like, or mixtures thereof. Although not intending to be bound by the following theory, these examples of fluoroorgano borate and fluoroorgano boron compounds, and related compounds, can form "weakly-coordinating" anions when combined with a transition metal complex (see e.g., U.S. Pat. No. 5,919,983, the disclosure of which is incorporated herein by reference in its entirety). Applicants also contemplate the use of diboron, or bis-boron, compounds or other bifunctional compounds containing two or more boron atoms in the chemical structure, such as disclosed in J. Am. Chem. Soc., 2005, 127, pp. 14756-14768, the content of which is incorporated herein by reference in its entirety.

Generally, any amount of organoboron compound can be used. According to one aspect of this invention, the molar ratio of the total moles of organoboron or organoborate compound (or compounds) to the total moles of metallocene compound(s) in the catalyst composition can be in a range from about 0.1:1 to about 15:1. Typically, the amount of the fluoroorgano boron or fluoroorgano borate compound used can be from about 0.5 moles to about 10 moles of boron/borate compound per mole of metallocene complex(es). According to another aspect of this invention, the amount of fluoroorgano boron or fluoroorgano borate compound can be from about 0.8 moles to about 5 moles of boron/borate compound per mole of metallocene complex(es).

Ionizing Ionic Compounds

In another aspect, catalyst compositions disclosed herein can comprise an ionizing ionic compound. An ionizing ionic compound is an ionic compound that can function as a co-catalyst to enhance the activity of the catalyst composition. While not intending to be bound by theory, it is believed that the ionizing ionic compound can be capable of reacting with a metallocene complex and converting the metallocene complex into one or more cationic metallocene complexes, or incipient cationic metallocene complexes. Again, while not intending to be bound by theory, it is believed that the ionizing ionic compound can function as an ionizing compound by completely or partially extracting an anionic ligand, such as a monoanionic ligand (e.g. chlorine, etc.), from the metallocene complex. However, the ionizing ionic compound can be a co-catalyst regardless of whether it is ionizes the metallocene compound, abstracts a ligand in a fashion as to form an ion pair, weakens the metal-ligand bond in the metallocene, simply coordinates to a ligand, or activates the metallocene by some other mechanism.

Further, it is not necessary that the ionizing ionic compound activate the metallocene compound only. The activation function of the ionizing ionic compound can be evident in the enhanced activity of catalyst composition as a whole, as compared to a catalyst composition that does not contain an ionizing ionic compound.

Examples of ionizing ionic compounds can include, but are not limited to, the following compounds: tri(n-butyl)ammonium tetrakis(p-tolyl)borate, tri(n-butyl) ammonium tetrakis (m-tolyl)borate, tri(n-butyl)ammonium tetrakis (2,4-dimethylphenyl)borate, tri(n-butyl)ammonium tetrakis(3,5-dimethylphenyl)borate, tri(n-butyl)ammonium tetrakis [3,5-bis(trifluoromethyl)phenyl]borate, tri(n-butyl)ammonium tetrakis(pentafluorophenyl)borate, N,N-dimethylanilinium tetrakis(p-tolyl)borate, N,N-dimethylanilinium tetrakis(m-tolyl)borate, N,N-dimethylanilinium tetrakis(2,4-dimethylphenyl)borate, N,N-dimethylanilinium tetrakis(3,5-dimethyl-phenyl)borate, N,N-dimethylanilinium tetrakis [3,5-bis (trifluoromethyl)phenyl]borate, N,N-dimethylanilinium tetrakis(pentafluorophenyl)borate, triphenylcarbenium tetrakis(p-tolyl)borate, triphenylcarbenium tetrakis(m-tolyl)borate, triphenylcarbenium tetrakis(2,4-dimethylphenyl)borate, triphenylcarbenium tetrakis(3,5-dimethylphenyl)borate, triphenylcarbenium tetrakis [3,5-bis(trifluoromethyl)phenyl]borate, triphenylcarbenium tetrakis (pentafluorophenyl)borate, tropylium tetrakis(p-tolyl)borate, tropylium tetrakis(m-tolyl)borate, tropylium tetrakis(2,4-dimethylphenyl)borate, tropylium tetrakis(3,5-dimethylphenyl)borate, tropylium tetrakis [3,5-bis(trifluoromethyl)phenyl]borate, tropylium tetrakis(pentafluorophenyl) borate, lithium tetrakis(pentafluorophenyl)borate, lithium tetraphenylborate, lithium tetrakis(p-tolyl)borate, lithium tetrakis(m-tolyl)borate, lithium tetrakis(2,4-dimethylphenyl)borate, lithium tetrakis(3,5-dimethylphenyl)borate, lithium tetrafluoroborate, sodium tetrakis(pentafluorophenyl)borate, sodium tetraphenylborate, sodium tetrakis(p-tolyl)borate, sodium tetrakis(m-tolyl)borate, sodium tetrakis(2,4-dimethylphenyl)borate, sodium tetrakis(3,5-dimethylphenyl)borate, sodium tetrafluoroborate, potassium tetrakis(pentafluorophenyl)borate, potassium tetraphenylborate, potassium tetrakis(p-tolyl)borate, potassium tetrakis(m-tolyl)borate, potassium tetrakis(2,4-dimethylphenyl)borate, potassium tetrakis(3,5-dimethylphenyl)borate, potassium tetrafluoroborate, lithium tetrakis(pentafluorophenyl)aluminate, lithium tetraphenylaluminate, lithium tetrakis(p-tolyl)aluminate, lithium tetrakis(m-tolyl)aluminate, lithium tetrakis(2,4-dimethylphenyl)aluminate, lithium tetrakis(3,5-dimethylphenyl)aluminate, lithium tetrafluoroaluminate, sodium tetrakis(pentafluorophenyl)aluminate, sodium tetraphenylaluminate, sodium tetrakis(p-tolyl)aluminate, sodium tetrakis(m-tolyl)aluminate, sodium tetrakis(2,4-dimethylphenyl)aluminate, sodium tetrakis(3,5-dimethylphenyl)aluminate, sodium tetrafluoroaluminate, potassium tetrakis(pentafluorophenyl)aluminate, potassium tetraphenylaluminate, potassium tetrakis(p-tolyl)aluminate, potassium tetrakis(m-tolyl)aluminate, potassium tetrakis(2,4-dimethylphenyl)aluminate, potassium tetrakis (3,5-dimethylphenyl)aluminate, potassium tetrafluoroaluminate, and the like, or combinations thereof. Ionizing ionic compounds useful in this invention are not limited to these; other examples of ionizing ionic compounds are disclosed in U.S. Pat. Nos. 5,576,259 and 5,807,938, the disclosures of which are incorporated herein by reference in their entirety.

Organozinc, Organomagnesium, & Organolithium Compounds

Other aspects are directed to catalyst compositions which can include an organozinc compound, an organomagnesium compound, an organolithium compound, or a combination thereof. In some aspects, these compounds have the following general formulas:

$$Zn(X^{10})(X^{11});$$

$$Mg(X^{12})(X^{13}); \text{ and}$$

$$Li(X^{14}).$$

In these formulas, $X^{10}$, $X^{12}$, and $X^{14}$ independently can be a $C_1$ to $C_{18}$ hydrocarbyl group, and $X^{11}$ and $X^{13}$ independently can be H, a halide, or a $C_1$ to $C_{18}$ hydrocarbyl or $C_1$ to $C_{18}$ hydrocarboxy group. It is contemplated $X^{10}$ and $X^{11}$ (or $X^{12}$ and $X^{13}$) can be the same, or that $X^{10}$ and $X^{11}$ (or $X^{12}$ and $X^{13}$) can be different.

In one aspect, $X^{10}$; $X^{11}$, $X^{12}$, $X^{13}$, and $X^{14}$ independently can be any $C_1$ to $C_{18}$ hydrocarbyl group, $C_1$ to $C_{12}$ hydrocarbyl group, $C_1$ to $C_8$ hydrocarbyl group, or $C_1$ to $C_5$ hydrocarbyl group disclosed herein. In another aspect, $X^{10}$, $X^{11}$, $X^{12}$, $X^{13}$, and $X^{14}$ independently can be any $C_1$ to $C_{18}$ alkyl group, $C_2$ to $C_{18}$ alkenyl group, $C_6$ to $C_{18}$ aryl group, or $C_7$ to $C_{18}$ aralkyl group disclosed herein; alternatively, any $C_1$ to $C_{12}$ alkyl group, $C_2$ to $C_{12}$ alkenyl group, $C_6$ to $C_{12}$ aryl group, or $C_7$ to $C_{12}$ aralkyl group disclosed herein; or alternatively, any $C_1$ to $C_5$ alkyl group, $C_2$ to $C_5$ alkenyl group, $C_6$ to $C_8$ aryl group, or $C_7$ to $C_8$ aralkyl group disclosed herein. Thus, $X^{10}$; $X^{11}$, $X^{12}$, $X^{13}$, and $X^{14}$ independently can be a methyl group, an ethyl group, a propyl group, a butyl group, a pentyl group, a hexyl group, a heptyl group, an octyl group, a nonyl group, a decyl group, a undecyl group, a dodecyl group, a tridecyl group, a tetradecyl group, a pentadecyl group, a hexadecyl group, a heptadecyl group, an octadecyl group, an ethenyl group, a propenyl group, a butenyl group, a pentenyl group, a hexenyl group, a heptenyl group, an octenyl group, a nonenyl group, a decenyl group, a undecenyl group, a dodecenyl group, a tridecenyl group, a tetradecenyl group, a pentadecenyl group, a hexadecenyl group, a heptadecenyl group, an octadecenyl group, a phenyl group, a naphthyl group, a benzyl group, or a tolyl group, and the like. In yet another aspect, $X^{10}$, $X^{11}$, $X^{12}$, $X^{13}$, and $X^{14}$ independently can be methyl, ethyl, propyl, butyl, or pentyl (e.g., neopentyl), or both $X^{10}$ and $X^{11}$ (or both $X^{12}$ and $X^{13}$) can be methyl, or ethyl, or propyl, or butyl, or pentyl (e.g., neopentyl).

$X^{11}$ and $X^{13}$ independently can be H, a halide, or a $C_1$ to $C_{18}$ hydrocarbyl or $C_1$ to $C_{18}$ hydrocarboxy group (e.g., any $C_1$ to $C_{18}$, $C_1$ to $C_{12}$, $C_1$ to $C_{10}$, or $C_1$ to $C_8$ hydrocarboxy group disclosed herein). In some aspects, $X^{11}$ and $X^{13}$ independently can be H, a halide (e.g., Cl), or a $C_1$ to $C_{18}$ hydrocarbyl or $C_1$ to $C_{18}$ hydrocarboxy group; alternatively, H, a halide, or a $C_1$ to $C_8$ hydrocarbyl or $C_1$ to $C_8$ hydrocarboxy group; or alternatively, H, Br, Cl, F, I, methyl, ethyl, propyl, butyl, pentyl (e.g., neopentyl), hexyl, heptyl, octyl, nonyl, decyl, ethenyl, propenyl, butenyl, pentenyl, hexenyl, heptenyl, octenyl, nonenyl, decenyl, phenyl, benzyl, tolyl, methoxy, ethoxy, propoxy, butoxy, pentoxy, phenoxy, toloxy, xyloxy, or benzoxy.

In other aspects, the organozinc and/or the organomagnesium compound can have one or two hydrocarbylsilyl moieties. Each hydrocarbyl of the hydrocarbylsilyl group can be any hydrocarbyl group disclosed herein (e.g., a $C_1$ to $C_{18}$ alkyl group, a $C_2$ to $C_{18}$ alkenyl group, a $C_6$ to $C_{18}$ aryl group, a $C_7$ to $C_{18}$ aralkyl group, etc.). Illustrative and non-limiting examples of hydrocarbylsilyl groups can include, but are not limited to, trimethylsilyl, triethylsilyl, tripropylsilyl (e.g., triisopropylsilyl), tributylsilyl, tripentylsilyl, triphenylsilyl, allyldimethylsilyl, trimethylsilylmethyl, and the like.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, and the like, or combinations thereof.

Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium prop oxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, and the like, or any combinations thereof.

Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl)methyllithium, allyllithium, and the like, or combinations thereof.

Olefin Monomers

Unsaturated reactants that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (a), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can be a $C_2$-$C_{20}$ olefin; alternatively, a $C_2$-$C_{20}$ α-olefin; alternatively, a $C_2$-$C_{12}$ olefin; alternatively, a $C_2$-$C_{10}$ α-olefin; alternatively, ethylene, propylene, 1-butene, 1-hexene, or 1-octene; alternatively, ethylene or propylene; alternatively, ethylene; or alternatively, propylene.

When a copolymer (or alternatively, a terpolymer) is desired, the olefin monomer can comprise, for example, ethylene or propylene, which is copolymerized with at least one comonomer (e.g., a $C_2$-$C_{20}$ α-olefin, a $C_3$-$C_{20}$ α-olefin, etc.). According to one aspect of this invention, the olefin monomer in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to one aspect of the present invention, the comonomer can comprise an α-olefin (e.g., a $C_3$-$C_{10}$ α-olefin), while in another aspect, the comonomer can comprise 1-butene, 1-pentene, 1-hexene, 1-octene, 1-decene, styrene, or any combination thereof. For example, the comonomer can comprise 1-butene, 1-hexene, 1-octene, or a combination thereof.

Generally, the amount of comonomer introduced into a polymerization reactor system to produce a copolymer can be from about 0.01 to about 50 weight percent of the comonomer based on the total weight of the monomer and comonomer. According to another aspect of the present invention, the amount of comonomer introduced into a polymerization reactor system can be from about 0.01 to about 40 weight percent comonomer based on the total weight of the monomer and comonomer. In still another aspect, the amount of comonomer introduced into a polymerization reactor system can be from about 0.1 to about 35 weight percent comonomer based on the total weight of the monomer and comonomer. Yet, in another aspect, the amount of comonomer introduced into a polymerization reactor system can be from about 0.5 to about 20 weight percent comonomer based on the total weight of the monomer and comonomer.

While not intending to be bound by this theory, where branched, substituted, or functionalized olefins are used as reactants, it is believed that a steric hindrance can impede and/or slow the polymerization reaction. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

Catalyst Compositions

In some aspects, the present invention can employ catalyst compositions containing an activator-support comprising a fluorided-chlorided silica-coated alumina, while in other aspects, the present invention can employ catalyst compositions containing a metallocene compound (one or more than one) and an activator-support comprising a fluorided-chlorided silica-coated alumina. These catalyst compositions can be utilized to produce polyolefins—homopolymers, copolymers, and the like—for a variety of end-use applications. Activator-supports comprising a fluorided-chlorided silica-coated alumina are discussed hereinabove. In aspects of the present invention, it is contemplated that the catalyst composition can contain more than one activator-support component. Further, additional catalytic compounds—other than those specified as the fluorided-chlorided silica-coated alumina and the metallocene compound—can be employed in the catalyst compositions and/or the polymerization processes, provided that the additional catalytic compound(s) does not detract from the advantages disclosed herein.

Generally, catalyst compositions of the present invention comprise a metallocene compound and an activator-support comprising a fluorided-chlorided silica-coated alumina. Various bridged, unbridged, and dinuclear metallocene compounds useful in the present invention are disclosed hereinabove. Optionally, such catalyst compositions can further comprise one or more than one co-catalyst compound or compounds (suitable co-catalysts, such as organoaluminum compounds, also are discussed hereinabove). Thus, a catalyst composition of this invention can comprise a metallocene compound, an activator-support comprising a fluorided-chlorided silica-coated alumina, and an organoaluminum compound. For example, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof. Accordingly, a catalyst composition consistent with aspects of the invention can comprise (or consist essentially of, or consist of) an unbridged zirconium or hafnium based metallocene compound; or a bridged zirconium or hafnium based metallocene compound with a fluorenyl group, and with no aryl groups on the bridging group; or a bridged zirconium or hafnium based metallocene compound with a fluorenyl group, and an aryl group on the bridging group; or a bridged zirconium or hafnium based metallocene compound with two indenyl groups; an activator-support comprising a fluorided-chlorided silica-coated alumina; and a co-catalyst (e.g., an organoaluminum compound, such as triethylaluminum or tri-isobutylaluminum).

In another aspect of the present invention, a catalyst composition is provided which comprises a metallocene compound, an activator-support comprising a fluorided-chlorided silica-coated alumina (with or without a co-catalyst), wherein this catalyst composition is substantially free of aluminoxanes, organoboron or organoborate compounds, ionizing ionic compounds, and/or other similar materials; alternatively, substantially free of aluminoxanes; alternatively, substantially free of organoboron or organoborate compounds; or alternatively, substantially free of ionizing ionic compounds. In these aspects, the catalyst composition has catalyst activity, discussed herein below, in the absence of these additional materials. For example, a catalyst composition of the present invention can consist essentially of a metallocene compound, an activator-support comprising a fluorided-chlorided silica-coated alumina (or a metallocene compound, an activator-support comprising a fluorided-chlorided silica-coated alumina, and an organoaluminum compound), wherein no other materials are present in the catalyst composition which would increase/decrease the activity of the catalyst composition by more than about 10% from the catalyst activity of the catalyst composition in the absence of said materials.

However, in other aspects of this invention, these co-catalysts can be employed. For example, a catalyst composition containing a metallocene compound and an activator-support comprising a fluorided-chlorided silica-coated alumina can further comprise an optional co-catalyst. Suitable co-catalysts in this aspect can include, but are not limited to, aluminoxane compounds, organoboron or organoborate compounds, ionizing ionic compounds, organoaluminum compounds, organozinc compounds, organomagnesium compounds, organolithium compounds, and the like, or any combination thereof; or alternatively, organoaluminum compounds, organozinc compounds, organomagnesium compounds, organolithium compounds, or any combination thereof. More than one co-catalyst can be present in the catalyst composition.

In a particular aspect contemplated herein, the catalyst composition can be a catalyst composition comprising a metallocene compound (one or more than one) and only one activator-support comprising a fluorided-chlorided silica-coated alumina. In a further aspect, the catalyst composition can be a catalyst composition comprising a metallocene compound (one or more than one), only one activator-support comprising a fluorided-chlorided silica-coated alumina, and a co-catalyst.

This invention further encompasses methods of making these catalyst compositions, such as, for example, contacting the respective catalyst components in any order or sequence. Hence, in one aspect, the catalyst composition can be produced by a process comprising contacting the metallocene compound and the activator-support comprising a fluorided-chlorided silica-coated alumina. In another aspect, the catalyst composition can be produced by a process comprising contacting, in any order, the metallocene compound, the activator-support comprising a fluorided-chlorided silica-coated alumina, and the co-catalyst (e.g., an organoaluminum compound).

The metallocene compound can be precontacted with an olefinic monomer if desired, not necessarily the olefin monomer to be polymerized, and an organoaluminum compound for a first period of time prior to contacting this precontacted mixture with the activator-support. The first period of time for contact, the precontact time, between the metallocene compound, the olefinic monomer, and the organoaluminum compound typically ranges from a time period of about 1 minute to about 24 hours, for example, from about 3 minutes to about 1 hour. Precontact times from about 10 minutes to about 30 minutes also can be employed. Alternatively, the precontacting process can be carried out in multiple steps, rather than a single step, in which multiple mixtures can be prepared, each comprising a different set of catalyst components. For example, at least two catalyst components can be contacted forming a first mixture, followed by contacting the first mixture with at least one other catalyst component forming a second mixture, and so forth.

Multiple precontacting steps can be carried out in a single vessel or in multiple vessels. Further, multiple precontacting steps can be carried out in series (sequentially), in parallel, or a combination thereof. For example, a first mixture of two catalyst components can be formed in a first vessel, a second mixture comprising the first mixture plus one additional catalyst component can be formed in the first vessel or in a second vessel, which is typically placed downstream of the first vessel.

In another aspect, one or more of the catalyst components can be split and used in different precontacting treatments. For example, part of a catalyst component can be fed into a first precontacting vessel for precontacting with at least one other catalyst component, while the remainder of that same catalyst component can be fed into a second precontacting vessel for precontacting with at least one other catalyst component, or can be fed directly into the reactor, or a combination thereof. The precontacting can be carried out in any suitable equipment, such as tanks, stirred mix tanks, various static mixing devices, a flask, a vessel of any type, or combinations of these apparatus.

In another aspect of this invention, the various catalyst components (for example, a metallocene compound, an activator-support comprising a fluorided-chlorided silica-coated alumina, an organoaluminum co-catalyst, and optionally an unsaturated hydrocarbon) can be contacted in the polymerization reactor simultaneously while the polymerization reaction is proceeding. Alternatively, any two or more of these catalyst components can be precontacted in a vessel prior to entering the reaction zone. This precontacting step can be continuous, in which the precontacted product can be fed continuously to the reactor, or it can be a stepwise or batchwise process in which a batch of precontacted product can be added to make a catalyst composition. This precontacting step can be carried out over a time period that can range from a few seconds to as much as several days, or longer. In this aspect, the continuous precontacting step generally can last from about 1 second to about 1 hour. In another aspect, the continuous precontacting step can last from about 10 seconds to about 45 minutes, or from about 1 minute to about 30 minutes.

Once the precontacted mixture of the metallocene compound, the olefin monomer (if used), and the organoaluminum co-catalyst is contacted with the activator-support, this composition (with the addition of the activator-support) can be termed the "postcontacted mixture." The postcontacted mixture optionally can remain in contact for a second period of time, the postcontact time, prior to initiating the polymerization process. Postcontact times between the precontacted mixture and the activator-support generally range from about 1 minute to about 24 hours. In a further aspect, the postcontact time can be in a range from about 3 minutes to about 1 hour. The precontacting step, the postcontacting step, or both, can increase the productivity of the polymer as compared to the same catalyst composition that is prepared without precontacting or postcontacting. However, neither a precontacting step nor a postcontacting step is required.

The postcontacted mixture can be heated at a temperature and for a time period sufficient to allow adsorption, impregnation, or interaction of precontacted mixture and the activator-support, such that a portion of the components of the precontacted mixture can be immobilized, adsorbed, or deposited thereon. Where heating is employed, the postcontacted mixture generally can be heated to a temperature of from between about 0° F. to about 150° F., or from about 40° F. to about 95° F.

When a precontacting step involving an olefin is used, the molar ratio of the total moles of olefin monomer to total moles of metallocene in the precontacted mixture typically can be in a range from about 1:10 to about 100,000:1. Total moles of each component are used in this ratio to account for aspects of this invention where more than one olefin monomer and/or more than one metallocene compound is employed in a precontacting step. Further, this molar ratio can be in a range from about 10:1 to about 1,000:1 in another aspect of the invention.

Generally, the weight ratio of organoaluminum compound to activator-support can be in a range from about 10:1 to about 1:1000. If more than one organoaluminum compound or more than one activator-support is employed, this ratio is based on the total weight of each respective component. In another aspect, the weight ratio of the organoaluminum compound to the activator-support can be in a range from about 3:1 to about 1:100, or from about 1:1 to about 1:50.

In some aspects of this invention, the weight ratio of metallocene compound to activator-support can be in a range from about 1:1 to about 1:1,000,000. In another aspect, this weight ratio can be in a range from about 1:5 to about 1:100,000, or from about 1:10 to about 1:10,000. Yet, in another aspect, the weight ratio of the metallocene compound to the activator-support can be in a range from about 1:20 to about 1:1000.

Catalyst compositions of the present invention generally have a catalyst activity greater than about 500 grams of polyethylene (homopolymer, copolymer, etc., as the context requires) per gram of fluorided-chlorided silica-coated alumina per hour (g/g/h). In another aspect, the catalyst activity can be greater than about 1,000, greater than about 2,000, or greater than about 2,500 g/g/h. In still another aspect, catalyst compositions of this invention can be characterized by having a catalyst activity greater than about 5,000, greater than about 6,000, or greater than about 7,500 g/g/h. Yet, in another aspect, the catalyst activity can be greater than about 10,000 g/g/h, or greater than about 12,000 g/g/h, and often can range up to 20,000-25,000 g/g/h. These activities are measured under slurry polymerization conditions with a triisobutylaluminum co-catalyst, using isobutane as the diluent, at a polymerization temperature of about 95° C. and a reactor pressure of about 400 psig.

Additionally or alternatively, catalyst compositions of the present invention generally have a catalyst activity greater than about 500 grams of polypropylene (homopolymer, copolymer, etc., as the context requires) per gram of fluorided-chlorided silica-coated alumina per hour (g/g/h). In another aspect, the catalyst activity can be greater than about 600, greater than about 750, or greater than about 800 g/g/h. In still another aspect, catalyst compositions of this invention can be characterized by having a catalyst activity greater than about 1,000, greater than about 2,000, or greater than about 2,500 g/g/h. Yet, in another aspect, the catalyst activity can be greater than about 3,000 g/g/h, or greater than about 4,000 g/g/h, and often can range up to 10,000-15,000 g/g/h. These activities are measured under slurry polymerization conditions, with a triisobutylaluminum co-catalyst, and a polymerization temperature of 70° C. and a reactor pressure of 450 psig.

Additionally or alternatively, catalyst compositions of the present invention generally have a catalyst activity greater than about 50,000 grams of polypropylene (homopolymer, copolymer, etc., as the context requires) per gram of metallocene compound per hour (g/gMet/h). In another aspect, the catalyst activity can be greater than about 75,000, greater than about 100,000, or greater than about 200,000 g/gMet/h. In still another aspect, catalyst compositions of this invention can be characterized by having a catalyst activity greater than about 350,000, greater than about 500,000, or greater than about 700,000 g/gMet/h. Yet, in another aspect, the catalyst activity can be greater than about 800,000 g/gMet/h, or greater than about 1,000,000 g/gMet/h, and often can range up to 2,000,000-3,000,000 g/gMet/h. These activities are measured under slurry polymerization conditions, with a triisobutylaluminum co-catalyst, and a polymerization temperature of 70° C. and a reactor pressure of 450 psig.

Moreover, catalyst compositions of the present invention (containing a fluorided-chlorided silica-coated alumina) can have catalyst activities greater than similar catalyst systems containing chlorided silica-coated alumina instead of fluorided-chlorided silica-coated alumina. In some aspects, the catalyst activity can be at least 2% greater, at least 5% greater, at least 10% greater, at least 50% greater, at least 100%, at least 200% greater, or at least 500% greater, and the like. For the catalyst activity comparison, all conditions used to prepare the activator-supports are held constant (e.g., same time and temperature conditions, same silica-coated alumina, same chloride loading, etc.) and all polymerization conditions are held constant (e.g., same amount of activator-support, same amount/type of metallocene and co-catalyst, polymerization temperature, etc.). Hence, the only difference is the additional fluoriding step used in preparing the fluorided-chlorided silica-coated alumina.

Likewise, catalyst compositions of the present invention (containing a fluorided-chlorided silica-coated alumina) can have catalyst activities greater than similar catalyst systems containing fluorided silica-coated alumina instead of fluorided-chlorided silica-coated alumina. In some aspects, the catalyst activity can be at least 2% greater, at least 5% greater, at least 10% greater, at least 25% greater, at least 50% greater, at least 70% greater, or at least 100% greater, and the like. For the catalyst activity comparison, all conditions used to prepare the activator-supports are held constant (e.g., same time and temperature conditions, same silica-coated alumina, same fluoride loading, etc.) and all polymerization conditions are held constant (e.g., same amount of activator-support, same amount/type of metallocene and co-catalyst, polymerization temperature, etc.). Hence, the only difference is the additional chloriding step used in preparing the fluorided-chlorided silica-coated alumina.

Additionally, catalyst compositions of the present invention (containing a fluorided-chlorided silica-coated alumina) can have catalyst activities greater than similar catalyst systems containing chlorided-fluorided silica-coated alumina (fluoriding step before chloriding step) instead of fluorided-chlorided silica-coated alumina. In some aspects, the catalyst activity can be at least 10% greater, at least 25% greater, at least 50% greater, at least 100% greater, at least 200% greater, at least 500% greater, or at least 1000% greater, etc. For the catalyst activity comparison, all conditions used to prepare the activator-supports are held constant (e.g., same time and temperature conditions, same silica-coated alumina, same chloride and fluoride loading, etc.) and all polymerization conditions are held constant (e.g., same amount of activator-support, same amount/type of metallocene and co-catalyst, polymerization temperature, etc.). Hence, the only difference is the order or sequence of the chloriding and fluoriding steps.

As discussed hereinabove, any combination of the metallocene compound, the activator-support comprising a fluorided-chlorided silica-coated alumina, the organoaluminum compound, and the olefin monomer (if used), can be precontacted in some aspects of this invention. When any precontacting occurs with an olefinic monomer, it is not necessary that the olefin monomer used in the precontacting step be the same as the olefin to be polymerized. Further, when a precontacting step among any combination of the catalyst components is employed for a first period of time, this precontacted mixture can be used in a subsequent postcontacting step between any other combination of catalyst components for a second period of time. For example, one or more metallocene compounds, the organoaluminum compound, and 1-hexene can be used in a precontacting step for a first period of time, and this precontacted mixture then can be contacted with the activator-support to form a postcontacted mixture that can be contacted for a second period of time prior to initiating the polymerization reaction. For example, the first period of time for contact, the precontact time, between any combination of the metallocene compound, the olefinic monomer, the activator-support, and the organoaluminum compound can be from about 1 minute to about 24 hours, from about 3 minutes to about 1 hour, or from about 10 minutes to about 30 minutes. The postcontacted mixture optionally can be allowed to remain in contact for a second period of time, the postcontact time, prior to initiating the polymerization process. According to one aspect of this invention, postcontact times between the precontacted mixture and any remaining catalyst components can be from about 1 minute to about 24 hours, or from about 5 minutes to about 1 hour.

Polymerization Processes

Catalyst compositions of the present invention can be used to polymerize olefins to form homopolymers, copolymers, terpolymers, and the like. One such process for polymerizing olefins in the presence of a catalyst composition of the present invention can comprise contacting the catalyst composition with an olefin monomer and optionally an olefin comonomer (one or more) in a polymerization reactor system under polymerization conditions to produce an olefin polymer, wherein the catalyst composition can comprise an activator-support comprising a fluorided-chlorided silica-coated alumina, a metallocene compound, and an optional co-catalyst. Activator-supports comprising a fluorided-chlorided silica-coated alumina, and suitable bridged, unbridged, and dinuclear metallocene compounds, are discussed hereinabove. The catalyst composition, optionally, can further comprise one or more than one organoaluminum compound or compounds (or other suitable co-catalyst). Thus, a process for polymerizing olefins in the presence of a catalyst composition can employ a catalyst composition comprising a metallocene compound (one or more), an activator-support comprising a fluorided-chlorided silica-coated alumina, and an organoaluminum compound. In some aspects, the organoaluminum compound can comprise (or consist essentially of, or consist of) trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, and the like, or combinations thereof.

In accordance with another aspect of the invention, the polymerization process can employ a catalyst composition comprising a metallocene compound, an activator-support comprising a fluorided-chlorided silica-coated alumina, and a co-catalyst, wherein the co-catalyst can comprise an aluminoxane compound, an organoboron or organoborate compound, an ionizing ionic compound, an organoaluminum compound, an organozinc compound, an organomagnesium compound, or an organolithium compound, or any combination thereof. Hence, aspects of this invention are directed to processes for polymerizing olefins in the presence of a catalyst composition, the processes comprising contacting a catalyst composition with an olefin monomer and optionally an olefin comonomer (one or more) under polymerization conditions to produce an olefin polymer, and the catalyst composition can comprise a metallocene compound, an activator-support comprising a fluorided-chlorided silica-coated alumina, and an aluminoxane compound; alternatively, a metallocene compound, an activator-support comprising a fluorided-chlorided silica-coated alumina, and an organoboron or organoborate compound; alternatively, a metallocene compound, an activator-support comprising a fluorided-chlorided silica-coated alumina, and an ionizing ionic compound; alternatively, a metallocene compound, an activator-support comprising a fluorided-chlorided silica-coated alumina, and an organoaluminum compound; alternatively, a metallocene compound, an activator-support comprising a fluorided-chlorided silica-coated alumina, and an organozinc compound; alternatively, a metallocene compound, an activator-support comprising a fluorided-chlorided silica-coated alumina, and an organomagnesium compound; or alternatively, a metallocene compound, an activator-support comprising a fluorided-chlorided silica-coated alumina, and an organolithium compound. Furthermore, more than one co-catalyst can be employed, e.g., an organoaluminum compound and an aluminoxane compound, an organoaluminum compound and an ionizing ionic compound, etc.

In accordance with another aspect of the invention, the polymerization process can employ a catalyst composition comprising a metallocene compound, only one activator-support component, and a co-catalyst, such as an organoaluminum compound.

The catalyst compositions of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. Suitable polymerization conditions are used for the various reactor types. Gas phase reactors can comprise fluidized bed reactors or staged horizontal reactors. Slurry reactors can comprise vertical or horizontal loops. High pressure reactors can comprise autoclave or tubular reactors. Reactor types can include batch or continuous processes. Continuous processes can use intermittent or continuous product discharge. Processes can also include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). Production of polymers in multiple reactors can include several stages in at least two separate polymerization reactors interconnected by a transfer device making it possible to transfer the polymers resulting from the first polymerization reactor into the second reactor. The desired polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both.

According to one aspect of the invention, the polymerization reactor system can comprise at least one loop slurry reactor comprising vertical or horizontal loops. Monomer, diluent, catalyst, and comonomer can be continuously fed to a loop reactor where polymerization occurs. Generally, continuous processes can comprise the continuous introduction of monomer/comonomer, a catalyst system, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, and 6,833,415, each of which is incorporated herein by reference in its entirety.

Suitable diluents used in slurry polymerization include, but are not limited to, the monomer being polymerized and hydrocarbons that are liquids under polymerization conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used. An example is polymerization of propylene monomer as disclosed in U.S. Pat. No. 5,455,314, which is incorporated by reference herein in its entirety.

According to yet another aspect of this invention, the polymerization reactor system can comprise at least one gas phase reactor. Such systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, and 5,436,304, each of which is incorporated by reference in its entirety herein.

According to still another aspect of the invention, a high pressure polymerization reactor system can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately to obtain optimal polymerization reaction conditions.

According to yet another aspect of the invention, the polymerization reactor system can comprise a solution polymerization reactor wherein the monomer (and comonomer, if used) are contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone is maintained at temperatures and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

Polymerization reactor systems suitable for the present invention can further comprise any combination of at least one raw material feed system, at least one feed system for catalyst or catalyst components, and/or at least one polymer recovery system. Suitable reactor systems for the present invention can further comprise systems for feedstock purification, catalyst storage and preparation, extrusion, reactor cooling, polymer recovery, fractionation, recycle, storage, loadout, laboratory analysis, and process control.

Polymerization conditions that are controlled for efficiency and to provide desired polymer properties can include temperature, pressure, and the concentrations of various reactants. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, or from about 60° C. to about 120° C., depending upon the type of polymerization reactor(s). In some reactor systems, the polymerization temperature generally can fall within a range from about 70° C. to about 100° C., or from about 75° C. to about 95° C. Various polymerization conditions can be held substantially constant, for example, for the production of a particular grade of olefin polymer.

Suitable pressures will also vary according to the reactor and polymerization type. The pressure for liquid phase polymerizations in a loop reactor is typically less than 1000 psig (6.9 MPa). Pressure for gas phase polymerization is usually at about 200 to 500 psig (1.4 MPa to 3.4 MPa). High pressure polymerization in tubular or autoclave reactors is generally run at about 20,000 to 75,000 psig (138 to 517 MPa). Polymerization reactors can also be operated in a supercritical region occurring at generally higher temperatures and pressures. Operation above the critical point of a pressure/temperature diagram (supercritical phase) may offer advantages.

Aspects of this invention are directed to olefin polymerization processes comprising contacting a catalyst composition with an olefin monomer and an optional olefin comonomer in a polymerization reactor system under polymerization conditions to produce an olefin polymer. The olefin polymer (e.g., an ethylene copolymer) produced by the process can have any of the polymer properties disclosed herein, for example, a melt index of less than or equal to about 25 g/10 min, a density in a range from about 0.89 g/cm$^3$ to about 0.96 g/cm$^3$, a Mw in a range from about 50,000 to about 700,000 g/mol, and/or a Mn in a range from about 5,000 to about 150,000 g/mol.

Aspects of this invention also are directed to olefin polymerization processes conducted in the absence of added hydrogen. An olefin polymerization process of this invention can comprise contacting a catalyst composition with an olefin monomer and optionally an olefin comonomer in a polymerization reactor system under polymerization conditions to produce an olefin polymer, wherein the catalyst composition can comprise a metallocene compound, an activator-support comprising a fluorided-chlorided silica-coated alumina, and an optional co-catalyst, wherein the polymerization process is conducted in the absence of added hydrogen (no hydrogen is added to the polymerization reactor system). As one of ordinary skill in the art would recognize, hydrogen can be generated in-situ by metallocene catalyst compositions in various olefin polymerization processes, and the amount generated can vary depending upon the specific catalyst composition and metallocene compound(s) employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a catalyst composition with an olefin monomer and optionally an olefin comonomer in a polymerization reactor system under polymerization conditions to produce an olefin polymer, wherein the catalyst composition comprises a metallocene compound, an activator-support comprising a fluorided-chlorided silica-coated alumina, and an optional co-catalyst, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The added hydrogen to olefin monomer ratio in the process can be controlled, for instance, at a weight ratio which falls within a range from about 25 ppm to about 1500 ppm, from about 50 to about 1000 ppm, or from about 100 ppm to about 750 ppm.

In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio within a range from about 5 ppm up to about 1000 ppm or so, and maintained at the ratio to within about +/−25% during the polymerization run. For instance, if the target ratio is 100 ppm, then maintaining the hydrogen:olefin monomer ratio substantially constant would entail maintaining the feed ratio between about 75 ppm and about 125 ppm. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, a propylene homopolymer, an ethylene copolymer (e.g., ethylene/α-olefin, ethylene/1-butene, ethylene/1-hexene, ethylene/1-octene, etc.), a propylene copolymer, an ethylene terpolymer, a propylene terpolymer, and the like, including combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Polymers of ethylene (homopolymers, copolymers, terpolymers, etc.) produced in accordance with some aspects of this invention generally can have a melt index (MI, g/10 min, ASTM D1238, 190° C. and 2,160 gram weight) from 0 to about 25 g/10 min. Melt indices in the range from 0 to about 10 g/10 min, from 0 to about 5 g/10 min, from 0 to about 2 g/10 min, or from 0 to about 1 g/10 min, are contemplated in other aspects of this invention. For example, a polymer of the present invention can have a melt index in a range from about 0.01 to about 25, from about 0.1 to about 25, from about 0.5 to about 25, from about 0.1 to about 10, from about 0.1 to about 3, from about 0.5 to about 3, or from about 0.5 to about 1.5 g/10 min.

The densities of ethylene-based polymers produced using the catalyst systems and processes disclosed herein often are greater than or equal to about 0.89 g/cm$^3$ (ASTM D1505 and ASTM D1928, procedure C). In one aspect of this invention, the density of the ethylene polymer can be in a range from about 0.89 to about 0.96 g/cm$^3$. Yet, in another aspect, the density can be in a range from about 0.91 to about 0.96 g/cm$^3$, such as, for example, from about 0.91 to about 0.95 g/cm³, from about 0.91 to about 0.94 g/cm³, or from about 0.91 to about 0.93 g/cm³.

Ethylene polymers, such as copolymers, terpolymers, etc., consistent with various aspects of the present invention generally can have weight-average molecular weights (Mw's), for instance, in a range from about 50,000 to about 700,000 g/mol, from about 75,000 to about 500,000 g/mol, from about 100,000 to about 500,000 g/mol, from about 100,000 to about 400,000 g/mol, or from about 150,000 to about 600,000 g/mol. Likewise, suitable non-limiting ranges of the number-average molecular weight (Mn) can include, but are not limited to, from about 5,000 to about 150,000 g/mol, from about 5,000 to about 50,000 g/mol, from about 10,000 to about 150,000 g/mol, from about 10,000 to about 100,000 g/mol, from about 10,000 to about 50,000 g/mol, or from about 50,000 to about 150,000 g/mol.

The ratio of Mw/Mn, or the polydispersity index, for the polymers of this invention are not limited to any particular range. In some aspects, however, the ratio of Mw/Mn can be in a range from about 2 to about 40, from about 2.2 to about 35, from about 2.2 to about 30, from about 2.4 to about 30, from about 2 to about 25, from about 2.2 to about 10, from about 2.2 to about 5, from about 2 to about 4, from about 2.2 to about 3, from about 2.4 to about 3.5, or from about 10 to about 40.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Applicants also contemplate a method for forming or preparing an article of manufacture comprising a polymer produced by any of the polymerization processes disclosed herein. For instance, a method can comprise (i) contacting a catalyst composition with an olefin monomer and an optional olefin comonomer in a polymerization reaction system under polymerization conditions to produce an olefin polymer, wherein the catalyst composition can comprise a metallocene compound, an activator-support comprising a fluorided-chlorided silica-coated alumina, and an optional co-catalyst (e.g., an organoaluminum compound); and (ii) forming an article of manufacture comprising the olefin polymer. The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, embodiments, modifications, and equivalents thereof which, after reading the description herein, may suggest themselves to one of ordinary skill in the art without departing from the spirit of the present invention or the scope of the appended claims.

Molecular weights and molecular weight distributions were obtained using a PL-GPC 220 (Polymer Labs, an Agilent Company) system equipped with a IR4 detector (Polymer Char, Spain) and three Styragel HMW-6E GPC columns (Waters, Mass.) running at 145° C. The flow rate of the mobile phase 1,2,4-trichlorobenzene (TCB) containing 0.5 g/L 2,6-di-t-butyl-4-methylphenol (BHT) was set at 1 mL/min, and polymer solution concentrations were in the range of 1.0-1.5 mg/mL, depending on the molecular weight. Sample preparation was conducted at 150° C. for nominally 4 h with occasional and gentle agitation, before the solutions were transferred to sample vials for injection. The integral calibration method was used to deduce molecular weights and molecular weight distributions using a Chevron Phillips Chemicals Company's HDPE polyethylene resin, MARLEX® BHB5003, as the standard. The integral table of the standard was pre-determined in a separate experiment with SEC-MALS.

Examples 1-14

The following bridged metallocene compound was used in Examples 1-14 (Me=methyl; t-Bu=tert-butyl):

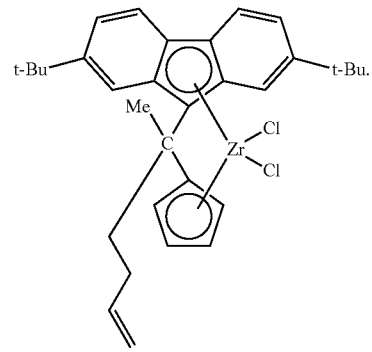

Sulfated alumina activator-supports were prepared from alumina (Alumina A from W.R. Grace) having a surface area of about 300 m²/g and a pore volume of about 1.2 mL/g. After being calcined in a muffle furnace for 12 hours at 600° C., the alumina was allowed to cool. Then, the calcined alumina was impregnated with a solution of sulfuric acid in methanol, such that 3 mL of methanol were added per gram of alumina. The methanol contained enough sulfuric acid to equal about 15% sulfate based on the weight of the sulfated alumina. This sulfate-impregnated alumina was then placed in a flat pan and allowed to dry under vacuum at approximately 110° C. for about 16 hours. To calcine the support, about 10 g of the powdered mixture were placed in a 1.75-inch quartz tube fitted with a sintered quartz disk at the bottom. While the powder was supported on the disk, air (nitrogen can be substituted) dried by passing through a 13× molecular sieve column was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 600° C. At this temperature, the powder was allowed to fluidize for about three hours in the dry air. Afterward, the sulfated alumina activator-support was collected and stored under dry nitrogen, and was used without exposure to the atmosphere (Examples 1-3).

Silica-coated aluminas were prepared as follows. The same alumina (Alumina A) used in preparing sulfated alumina was first calcined at about 600° C. for approximately 6 hours, cooled to ambient temperature, and then contacted with tetraethylorthosilicate in isopropanol to equal 25 wt. % $SiO_2$. After drying, silica-coated aluminas were calcined at the peak calcining temperatures noted in Table I for 3 hours. Sulfated silica-coated alumina (8 wt. % sulfate) was prepared in a manner similar to that described above for sulfated alumina, and calcined for 3 hours at the same temperature as the peak calcining temperature (Example 4). Fluorided silica-coated alumina (7 wt. % F) was prepared by impregnating the calcined silica-coated alumina with an ammonium bifluoride solution in methanol, drying, and then calcining for 3 hours at the same temperature as the peak calcining temperature (Examples 7-8). Chlorided silica-coated alumina (8 wt. % Cl) was prepared by treating the silica-coated alumina with carbon tetrachloride vapor in $N_2$, and then calcining for 3 hours at the same temperature as the peak calcining temperature (Example 6). Fluorided-sulfated silica-coated alumina (4 wt. % sulfate+4 wt. % F) and fluorided-sulfated alumina (10 wt. % sulfate+6 wt. % F) were prepared by impregnating the support with an ammonium sulfate and ammonium bifluoride aqueous solution, evaporating the water, and then calcining for 3 hours at the same temperature as the peak calcining temperature (Examples 5 and 9).

Fluorided-chlorided silica-coated aluminas (4 wt. % Cl+7 wt. % F) were produced by first calcining at the peak calcining temperatures noted in Table I (500° C. for Example 10; 800° C. for Examples 11-12; and 900° C. for Examples 13-14 in a carbon monoxide (reducing) atmosphere). The chloriding step involved injecting and vaporizing $CCl_4$ into the gas stream (typically, over a time period of less than about 5 minutes) used to fluidize the silica-coated alumina during calcination at the peak chloriding temperature of 500° C. (total duration of the calcining operation was 4 hours). The fluoriding step involved injecting and vaporizing tetrafluoroethane into the gas stream (typically, over a time period of less than about 5 minutes) used to fluidize the chlorided silica-coated alumina during calcination at the peak fluoriding temperature of 500° C. (total duration of the calcining operation was 4.5 hours).

All polymerization runs were conducted in a one-gallon stainless steel reactor with 1.8 L of isobutane. A metallocene solution was prepared at about 1 mg/mL in toluene. Either 0.5 mL or 1 mL of 1 M triisobutylaluminum, 20 to 100 mg of the activator-support, and 3 mg of the metallocene compound were added in that order through a charge port while slowly venting isobutane vapor. The charge port was closed and isobutane was added. The contents of the reactor were stirred and heated to the desired run temperature of about 95° C., and ethylene was then introduced into the reactor. Ethylene was fed on demand to maintain the target pressure of 400 psig pressure for the 30 min length of the polymerization run. The reactor was maintained at the desired temperature throughout the run by an automated heating-cooling system.

Table I summarizes certain aspects of Examples 1-14. The catalyst activity is listed in grams of polyethylene per gram of the respective activator-support per hour (g/g/h). Unexpectedly, catalyst systems containing a fluorided-chlorided silica-coated alumina activator-support had catalyst activities of over 13,000 g/g/h (Examples 10-14). Under the same polymerization conditions, the catalyst systems of Examples 10-14 had catalyst activities of 20-60% greater than the most active catalyst system of Examples 1-9 (Example 8 at 10,980 g/g/h versus Examples 10-14 at 13,590-17,830 g/g/h).

TABLE I

Examples 1-14.

| Example | Activator-Support | Temperature (° C.) | 1M TIBA (mL) | Activity (g/g/h) |
|---|---|---|---|---|
| 1 | 15% sulfate – alumina | 600 | 1 | 6,140 |
| 2 | 15% sulfate – alumina | 600 | 0.5 | 4,450 |
| 3 | 15% sulfate – alumina | 600 | 0.5 | 4,990 |
| 4 | 8% sulfate – silica-coated alumina | 600 | 1 | 1,350 |
| 5 | 4% sulfate + 4% fluoride – silica-coated alumina | 600 | 1 | 6,850 |
| 6 | 8% chloride – silica-coated alumina | 450 | 0.5 | 2,070 |
| 7 | 7% fluoride – silica-coated alumina | 600 | 0.5 | 9,860 |
| 8 | 7% fluoride – silica-coated alumina | 600 | 0.5 | 10,980 |
| 9 | 10% sulfate + 6% fluoride – alumina | 600 | 0.5 | 2,450 |
| 10 | 4% chloride + 7% fluoride – silica-coated alumina | 500 | 0.5 | 16,290 |
| 11 | 4% chloride + 7% fluoride – silica-coated alumina | 800/500/500 | 0.5 | 17,830 |
| 12 | 4% chloride + 7% fluoride – silica-coated alumina | 800/500/500 | 0.5 | 14,820 |
| 13* | 4% chloride + 7% fluoride – silica-coated alumina | 900/500/500 | 0.5 | 14,500 |
| 14* | 4% chloride + 7% fluoride – silica-coated alumina | 900/500/500 | 0.5 | 13,590 |

*All calcining procedures in Examples 13-14 were conducted in a reducing atmosphere (carbon monoxide).

Examples 15-17

The following bridged and unbridged metallocene compounds were used in Examples 15-17 (Ph=phenyl; t-Bu=tert-butyl):

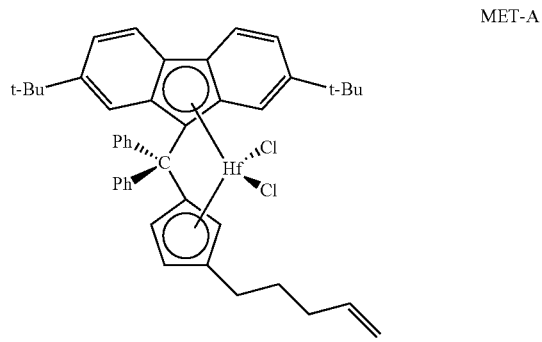

MET-A

-continued

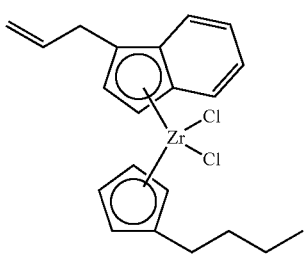

MET-B

The sulfated alumina used in Example 17 was the same as that used in Examples 1-3 above, the fluorided silica-coated alumina in Example 15 was the same as that used in Example 8 above, and the fluorided-chlorided silica-coated alumina was the same as that used in Example 10 above. The polymerization experiments of Examples 15-17 were performed in substantially the same manner as Examples 1-14, except that 0.8 mL of 1 M triisobutylaluminum, 150 mg of the activator-support, 1.2 mg MET-A, and 1.4 mg of MET-B were used. Additionally, 175 ppm of $H_2$ was fed to the reactor, based on the weight of the ethylene feed, and 5 g of 1-hexene.

Table II summarizes certain aspects of Examples 15-17. The SSA catalyst activity is listed in grams of polyethylene per gram of the respective activator-support per hour (g/g/h), and the metallocene catalyst activity is listed in grams of polyethylene per total grams of metallocene compounds per hour (g/g/h). Unexpectedly, the dual catalyst system containing a fluorided-chlorided silica-coated alumina activator-support had a catalyst activity 14% greater than that of a dual catalyst system containing a fluorided silica-coated alumina, and a catalyst activity 80% greater than that of a dual catalyst system containing a sulfated alumina.

FIG. 1 illustrates the molecular weight distributions (amount of polymer versus logarithm of molecular weight) of the polymers of Examples 15-17. Surprisingly, the polymer of Example 16, produced using the dual catalyst system containing the fluorided-chlorided silica-coated alumina activator-support, resulted in the largest amount of the high molecular weight component of the polymer, as compared to the polymers of Examples 15 and 17.

TABLE II

Examples 15-17.

| Example | Activator-Support | Temperature (° C.) | Metallocene Activity (g/g/h) | SSA Activity (g/g/h) |
|---|---|---|---|---|
| 15 | 7% fluoride – silica-coated alumina | 92° C. | 110,770 | 1,920 |
| 16 | 4% chloride + 7% fluoride – silica-coated alumina | 92° C. | 126,150 | 2,190 |
| 17 | 15% sulfate – alumina | 92° C. | 68,720 | 1,190 |

Examples 18-52

The bridged metallocene compound, rac-dimethylsilyl-bis (2-methylindenyl) zirconium dichloride, was used in Examples 18-52. The fluorided silica-coated alumina in Examples 18-24 was the same as that used in Example 8 above (the fluorided silica-coated alumina used in Examples 25-26 was prepared the same as that in Examples 18-24, except the peak fluoriding temperature during calcination was 400° C. instead of 600° C.). The sulfated silica-coated alumina used in Example 27 was the same as that used in Example 4 above.

The fluorided-chlorided silica-coated alumina used in Examples 28-35 was the same as that used in Example 10 above (the fluorided-chlorided silica-coated alumina used in Examples 38-42 was prepared the same as that in Examples 28-35, except the peak calcining temperature, the peak chloriding temperature, and the peak fluoriding temperature were 600° C. instead of 500° C.). The chlorided-fluorided silica-coated alumina used in Examples 36-37 was prepared the same as the fluorided-chlorided silica-coated alumina in Examples 28-35, except the order of the fluoriding and the chloriding steps were reversed. The fluorided-chlorided silica-coated alumina used in Examples 43-47 was the same as that used in Example 10 above, and the fluorided-chlorided silica-coated alumina used in Examples 48-52 was the same as that used in Example 12 above.

Propylene polymerization runs were conducted in a one-gallon stainless steel reactor with 2.4 L of liquid propylene. A metallocene solution was prepared at about 1 mg/mL in toluene. Approximately 0.5 mL of 1 M triisobutylaluminum, the activator-support, and the metallocene compound were added in that order through a charge port under a nitrogen purge. The metallocene:activator-support weight ratios were as follows: 0.2 wt. %=0.25 mg:125 mg; 0.33 wt. %=0.5 mg:150 mg; 0.5 wt. %=0.5 mg:100 mg; 1 wt. %=0.5 mg:50 mg; and 2 wt. %=1 mg:50 mg. The charge port was closed and propylene was added. The contents of the reactor were stirred and heated to the desired run temperature of about 70° C. The reactor pressure was 450 psig, and the length of the polymerization run was 30 minutes. The reactor was maintained at the desired temperature throughout the run by an automated heating-cooling system.

Figure 2:
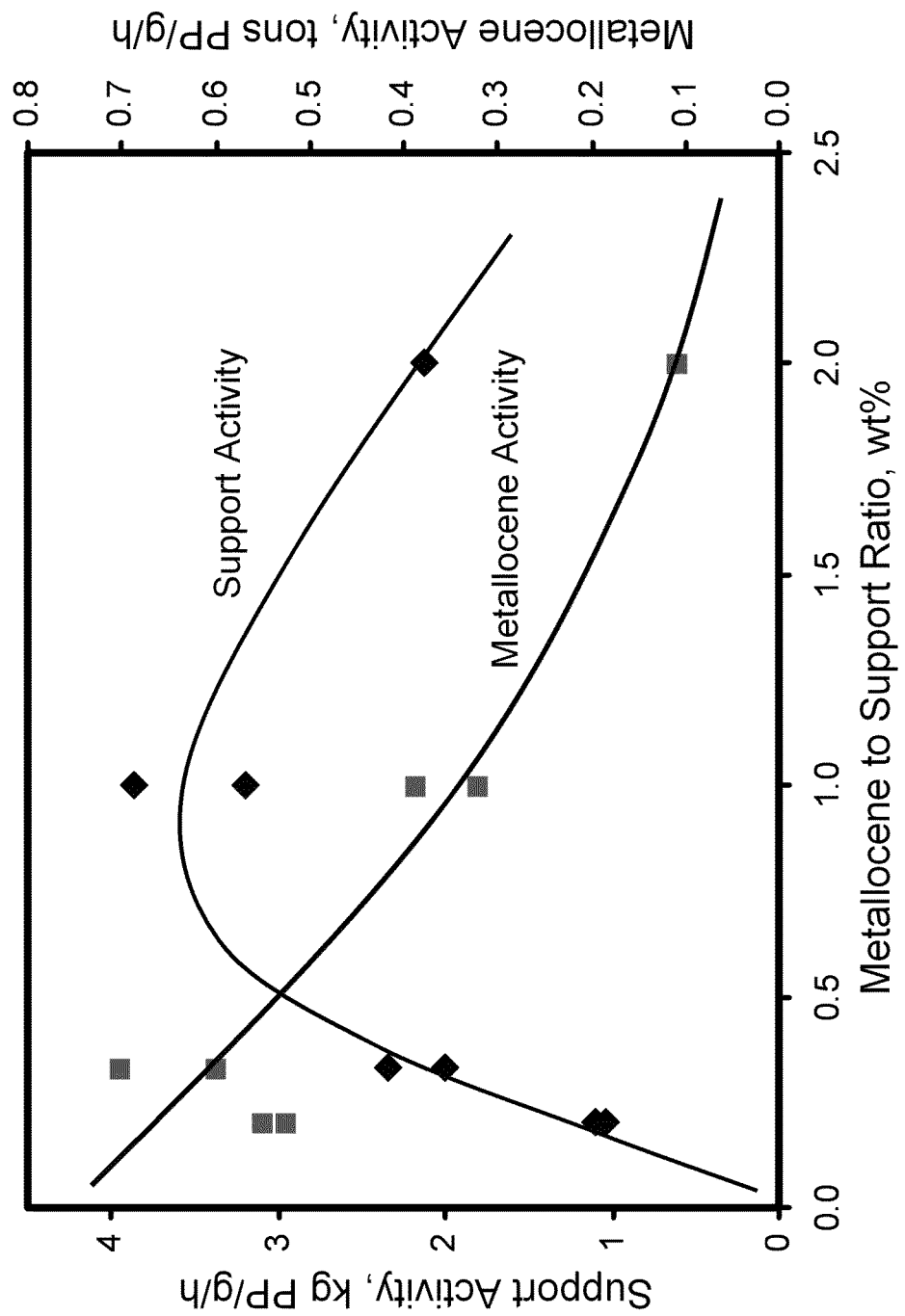
FIG. 2 presents a plot of the catalyst activity based on the weight of the activator-support, and the catalyst activity based on the weight of the metallocene compound, versus the weight percent of the metallocene compound to the activator-support, for Examples 18-24.
Figure 3:
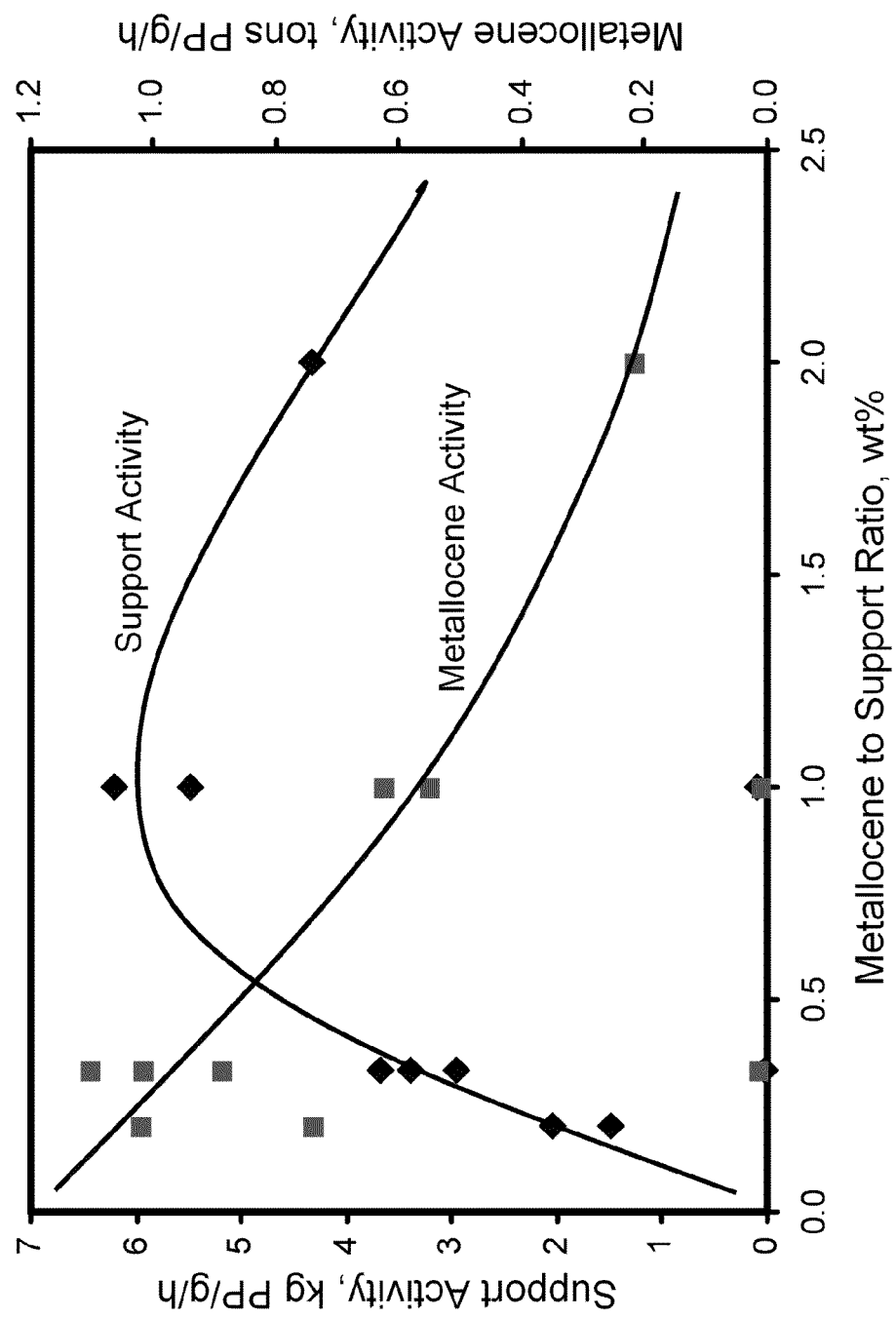
FIG. 3 presents a plot of the catalyst activity based on the weight of the activator-support, and the catalyst activity based on the weight of the metallocene compound, versus the weight percent of the metallocene compound to the activator-support, for Examples 28-35.
Figure 4:
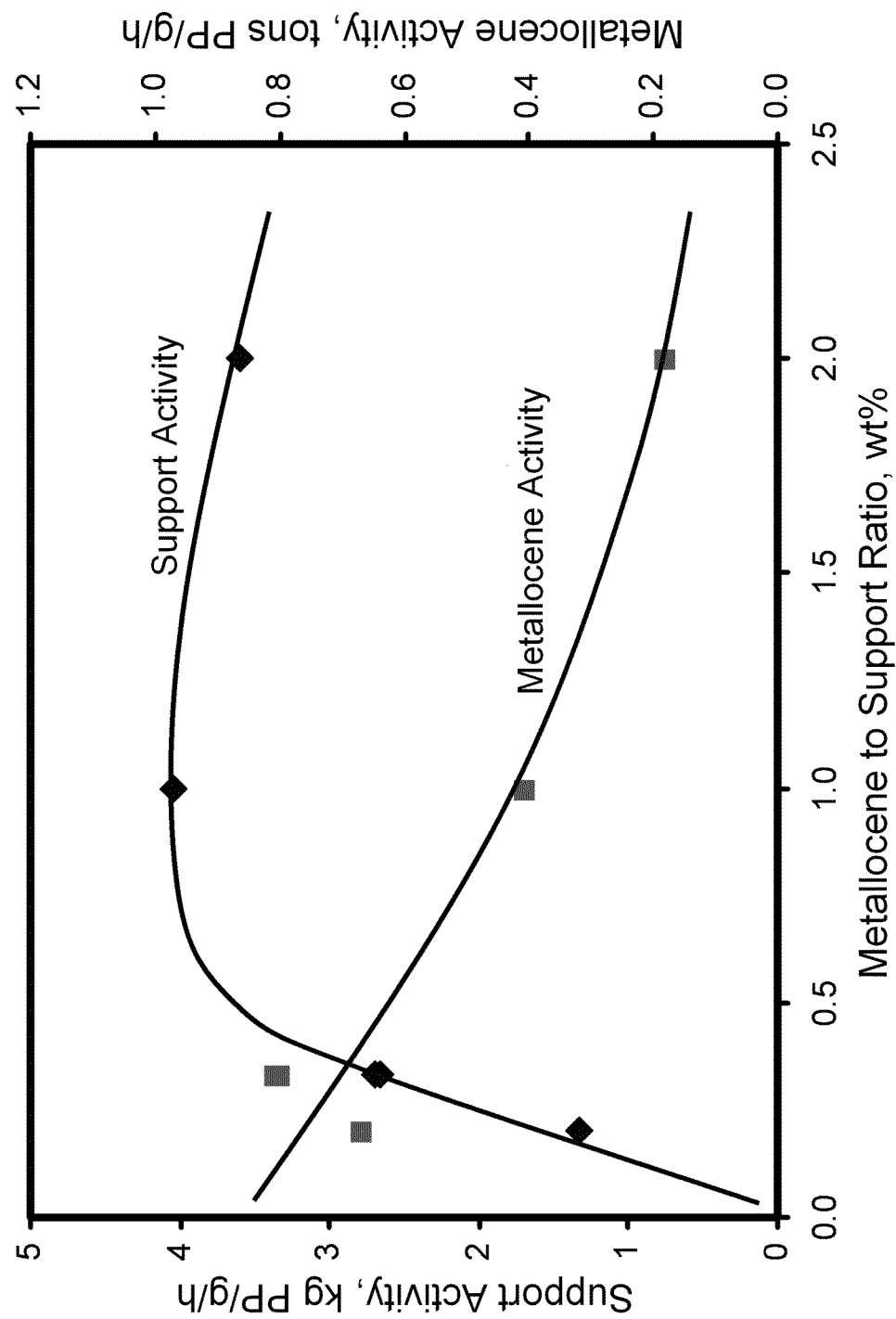
FIG. 4 presents a plot of the catalyst activity based on the weight of the activator-support, and the catalyst activity based on the weight of the metallocene compound, versus the weight percent of the metallocene compound to the activator-support, for Examples 38-42.
Figure 5:
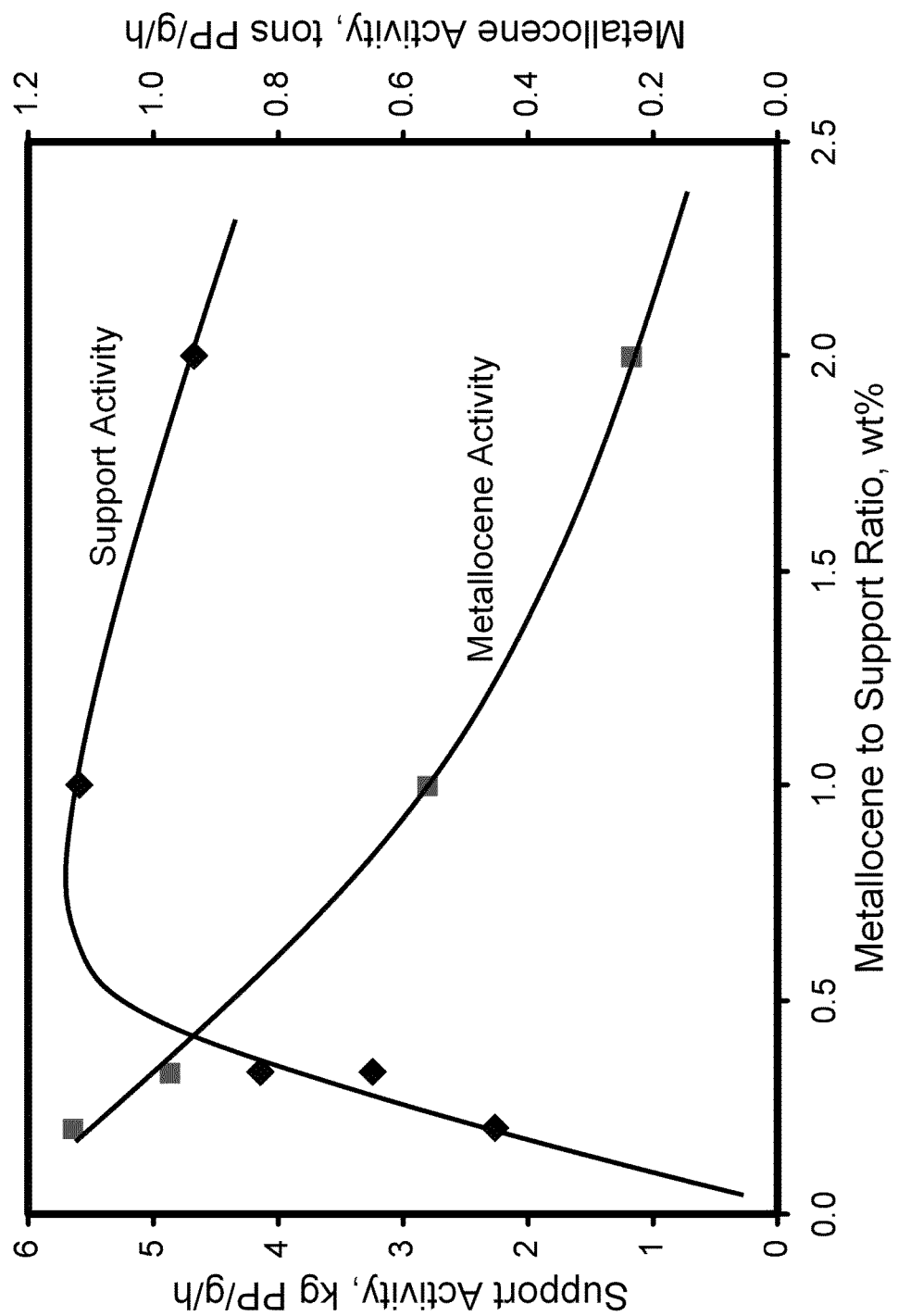
FIG. 5 presents a plot of the catalyst activity based on the weight of the activator-support, and the catalyst activity based on the weight of the metallocene compound, versus the weight percent of the metallocene compound to the activator-support, for Examples 43-47.
Figure 6:
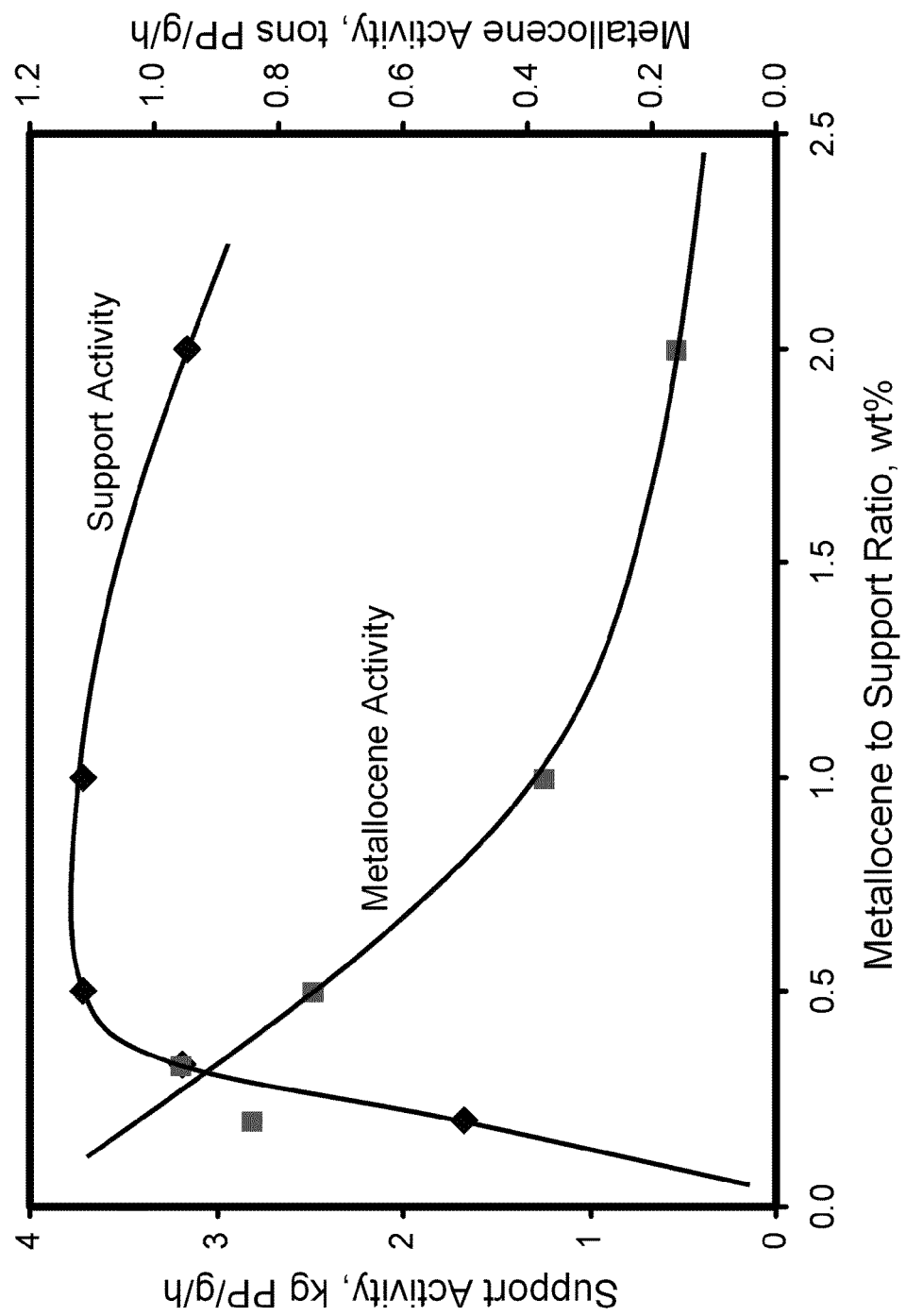
FIG. 6 presents a plot of the catalyst activity based on the weight of the activator-support, and the catalyst activity based on the weight of the metallocene compound, versus the weight percent of the metallocene compound to the activator-support, for Examples 48-52.

Table III and Table IV summarize certain aspects of Examples 18-52. In Table III, the activator-support catalyst activity is listed in grams of polypropylene per gram of the respective activator-support per hour (g/g/h). In Table IV, the metallocene catalyst activity is listed in grams of polypropylene per gram of metallocene compound per hour (g/g/h). Catalyst activity data from Table III and Table IV are illustrated graphically as a function of the weight percentage of the metallocene compound to the activator-support in FIG. 2 (Examples 18-24), FIG. 3 (Examples 28-35), FIG. 4 (Examples 38-42), FIG. 5 (Examples 43-47), and FIG. 6 (Examples 48-52). From these tables and figures, it is apparent that catalyst systems containing a fluorided-chlorided silica-coated alumina activator-support had exceptional catalyst activity for the production of polypropylene; for example, see FIG. 3 (Examples 28-35) and FIG. 5 (Examples 43-47).

Also unexpectedly, the order of the chloriding and fluoriding steps was found to have a significant impact on catalyst activity. Catalyst systems containing a chlorided-fluorided silica-coated alumina (Examples 36-37; fluoriding, then chloriding) had only a small fraction (less than 2%) of the catalyst activity of catalyst systems containing a fluorided-chlorided silica-coated alumina (Examples 28-35; chloriding, then fluoriding).

TABLE III

Examples 18-52.
Activator-Support Activity (g/g/h)

| Metallocene | Activator-Support (wt. %) | | | | |
|---|---|---|---|---|---|
| | 0.20 | 0.33 | 0.50 | 1.0 | 2.0 |
| 600° C., F 600° C. (Examples 18-24) | 1,100 | 2,340 | | 3,870 | 2,130 |
| | 1,050 | 2,000 | | 3,200 | |
| 600° C., F 400° C. (Examples 25-26) | | 2,040 | | 4,720 | |
| 600° C., sulfate 600° C. (Example 27) | | 7 | | | |
| 500° C., Cl 500° C., F 500° C. (Examples 28-35) | 1,480 | 2,950 | | 5,480 | 4,320 |
| | 2,040 | 3,390 | | 6,210 | |
| | | | 3,670 | | |
| 500° C., F 500° C., Cl 500° C. (Examples 36-37) | | 35 | | 92 | |
| 600° C., Cl 600° C., F 600° C. (Examples 38-42) | 1,340 | 2,670 | | 4,040 | 3,600 |
| | | 2,690 | | | |
| 800° C., Cl 500° C., F 500° C. (Examples 43-47) | 2,260 | 4,150 | | 5,600 | 4,680 |
| | | 3,240 | | | |
| 900° C., Cl 500° C., F 500° C. (Examples 48-52) * | 1,680 | 3,190 | 3,720 | 3,720 | 3,160 |

* All calcining procedures in Examples 48-52 were conducted in a reducing atmosphere (carbon monoxide).

TABLE IV

Examples 18-52.
Metallocene Activity (g/g/h)

| Metallocene | Activator-Support (wt. %) | | | | |
|---|---|---|---|---|---|
| | 0.20 | 0.33 | 0.50 | 1.00 | 2.00 |
| 600° C., F 600° C. (Examples 18-24) | 549,330 | 701,330 | | 386,670 | 106,670 |
| | 523,200 | 600,000 | | 320,000 | |
| 600° C., F 400° C. (Examples 25-26) | | 610,670 | | 472,000 | |
| 600° C., sulfate 600° C. (Example 27) | | 2,000 | | | |
| 500° C., Cl 500° C., F 500° C. (Examples 28-35) | 740,000 | 886,000 | | 548,000 | 216,000 |
| | 1,018,670 | 1,106,000 | | 621,330 | |
| | | 1,101,330 | | | |
| 500° C., F 500° C., Cl 500° C. (Examples 36-37) | | 10,400 | | 9,200 | |
| 600° C., Cl 600° C., F 600° C. (Examples 38-42) | 668,000 | 800,000 | | 404,000 | 180,000 |
| | | 808,000 | | | |
| 800° C., Cl 500° C., F 500° C. (Examples 43-47) | 1,128,000 | 1,244,000 | | 560,000 | 234,000 |
| | | 972,000 | | | |
| 900° C., Cl 500° C., F 500° C. (Examples 48-52) * | 840,000 | 956,000 | 744,000 | 372,000 | 158,000 |

* All calcining procedures in Examples 48-52 were conducted in a reducing atmosphere (carbon monoxide).

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments are described as "comprising" but, alternatively, can "consist essentially of" or "consist of"):

Embodiment 1. A catalyst composition comprising a metallocene compound, an activator-support comprising a fluorided-chlorided silica-coated alumina, and an optional co-catalyst.

Embodiment 2. The composition defined in embodiment 1, wherein the metallocene compound comprises chromium, vanadium, titanium, zirconium, hafnium, or a combination thereof.

Embodiment 3. The composition defined in embodiment 1 or 2, wherein the metallocene compound comprises titanium, zirconium, hafnium, or a combination thereof.

Embodiment 4. The composition defined in any one of the preceding embodiments, wherein the metallocene compound comprises any metallocene compound disclosed herein.

Embodiment 5. The composition defined in any one of embodiments 1-4, wherein the metallocene compound comprises an unbridged zirconium or hafnium based metallocene compound and/or an unbridged zirconium and/or hafnium based dinuclear metallocene compound.

Embodiment 6. The composition defined in any one of embodiments 1-4, wherein the metallocene compound comprises an unbridged zirconium or hafnium based metallocene compound containing two cyclopentadienyl groups, two indenyl groups, or a cyclopentadienyl and an indenyl group.

Embodiment 7. The composition defined in any one of embodiments 1-4, wherein the metallocene compound comprises an unbridged zirconium based metallocene compound containing two cyclopentadienyl groups, two indenyl groups, or a cyclopentadienyl and an indenyl group.

Embodiment 8. The composition defined in any one of embodiments 1-4, wherein the metallocene compound comprises an unbridged zirconium based homodinuclear metallocene compound.

Embodiment 9. The composition defined in any one of embodiments 1-4, wherein the metallocene compound comprises an unbridged hafnium based homodinuclear metallocene compound.

Embodiment 10. The composition defined in any one of embodiments 1-4, wherein the metallocene compound comprises an unbridged zirconium and/or hafnium based heterodinuclear metallocene compound.

Embodiment 11. The composition defined in any one of embodiments 1-4, wherein the metallocene compound comprises a bridged zirconium based metallocene compound with a fluorenyl group, and with no aryl groups on the bridging group.

Embodiment 12. The composition defined in any one of embodiments 1-4, wherein the metallocene compound comprises a bridged zirconium based metallocene compound with a cyclopentadienyl group and a fluorenyl group, and with no aryl groups on the bridging group.

Embodiment 13. The composition defined in any one of embodiments 1-4, wherein the metallocene compound comprises a bridged zirconium or hafnium based metallocene compound with a fluorenyl group, and an aryl group on the bridging group.

Embodiment 14. The composition defined in any one of embodiments 1-4, wherein the metallocene compound comprises a bridged zirconium or hafnium based metallocene compound with a cyclopentadienyl group and fluorenyl group, and an aryl group on the bridging group.

Embodiment 15. The composition defined in any one of embodiments 1-4, wherein the metallocene compound comprises a bridged zirconium based metallocene compound with a fluorenyl group, and an aryl group on the bridging group.

Embodiment 16. The composition defined in any one of embodiments 1-4, wherein the metallocene compound comprises a bridged hafnium based metallocene compound with a fluorenyl group, and an aryl group on the bridging group.

Embodiment 17. The composition defined in any one of embodiments 13-16, wherein the aryl group is a phenyl group.

Embodiment 18. The composition defined in any one of embodiments 1-4, wherein the metallocene compound comprises a bridged zirconium or hafnium based metallocene compound with two indenyl groups.

Embodiment 19. The composition defined in any one of embodiments 1-4, wherein the metallocene compound comprises a bridged zirconium based metallocene compound with two indenyl groups.

Embodiment 20. The composition defined in any one of embodiments 18-19, wherein the bridging group contains a silicon atom.

Embodiment 21. The composition defined in any one of embodiments 1-20, wherein the catalyst composition comprises only one metallocene compound.

Embodiment 22. The composition defined in any one of embodiments 1-20, wherein the catalyst composition comprises two or more metallocene compounds.

Embodiment 23. The composition defined in any one of embodiments 1-20, wherein the catalyst composition comprises two metallocene compounds at any weight ratio disclosed herein, e.g., from about 20:1 to about 1:20, from about 2:1 to about 1:2, etc.

Embodiment 24. The composition defined in any one of embodiments 1-23, wherein the fluorided-chlorided silica-coated alumina comprises a silica-coated alumina comprising silica in any range of weight percentages disclosed herein, e.g., from about 10 to about 80 wt. % silica, from about 20 to about 70 wt. % silica, from about 25 to about 50 wt. % silica, etc., based on the weight of the silica-coated alumina.

Embodiment 25. The composition defined in any one of embodiments 1-24, wherein the fluorided-chlorided silica-coated alumina comprises an amount of fluorine in any range of weight percentages disclosed herein, e.g., from about 2 to about 15 wt. % F, from about 3 to about 10 wt. % F, from about 4 to about 9 wt. % F, etc., based on the weight of the fluorided-chlorided silica-coated alumina.

Embodiment 26. The composition defined in any one of embodiments 1-25, wherein the fluorided-chlorided silica-coated alumina comprises an amount of chlorine in any range of weight percentages disclosed herein, e.g., from about 0.1% to about 20 wt. % Cl, from about 1% to about 10 wt. % Cl, from about 2 to about 7 wt. % Cl, etc., based on the weight of the fluorided-chlorided silica-coated alumina.

Embodiment 27. The composition defined in any one of embodiments 1-26, wherein the fluorided-chlorided silica-coated alumina has a pore volume in any range of pore volumes disclosed herein, e.g., from about 0.5 to about 2.5 mL/g, from about 0.9 to about 2.0 mL/g, from about 1.0 to about 1.5 mL/g, etc.

Embodiment 28. The composition defined in any one of embodiments 1-27, wherein the fluorided-chlorided silica-coated alumina has a surface area in any range of surface areas disclosed herein, e.g., from about 150 to about 700 $m^2/g$, from about 200 to about 700 $m^2/g$, from about 250 to about 500 $m^2/g$, etc.

Embodiment 29. The composition defined in any one of the preceding embodiments, wherein the catalyst composition comprises a co-catalyst, e.g., any co-catalyst disclosed herein.

Embodiment 30. The composition defined in any one of the preceding embodiments, wherein the co-catalyst comprises an aluminoxane compound, an organoboron or organoborate compound, an ionizing ionic compound, an organoaluminum compound, an organozinc compound, an organomagnesium compound, an organolithium compound, or any combination thereof.

Embodiment 31. The composition defined in any one of the preceding embodiments, wherein the co-catalyst comprises any organoaluminum compound disclosed herein.

Embodiment 32. The composition defined in any one of the preceding embodiments, wherein the co-catalyst comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 33. The composition defined in any one of embodiments 1-29, wherein the co-catalyst comprises an organoaluminum compound, an organozinc compound, an organomagnesium compound, an organolithium compound, or any combination thereof.

Embodiment 34. The composition defined in any one of embodiments 1-29, wherein the catalyst composition is substantially free of aluminoxane compounds, organoboron or organoborate compounds, ionizing ionic compounds, or combinations thereof.

Embodiment 35. The composition defined in any one of embodiments 1-34, wherein the catalyst composition is produced by a process comprising contacting the metallocene compound and the activator-support.

Embodiment 36. The composition defined in any one of embodiments 1-34, wherein the catalyst composition is produced by a process comprising contacting, in any order, the metallocene compound, the activator-support, and the co-catalyst.

Embodiment 37. The composition defined in any one of embodiments 1-36, wherein a catalyst activity of the catalyst composition is in any range disclosed herein, e.g., greater than about 1000 grams, greater than about 5000 grams, greater than about 10,000 grams, etc., of polyethylene per gram of fluorided-chlorided silica-coated alumina per hour, under slurry polymerization conditions, with a triisobutyla-luminum co-catalyst, using isobutane as a diluent, and with a polymerization temperature of 95° C. and a reactor pressure of 400 psig.

Embodiment 38. The composition defined in any one of embodiments 1-37, wherein a catalyst activity of the catalyst composition is in any range disclosed herein, e.g., greater than about 1000 grams, greater than about 2000 grams, greater than about 4000 grams, etc., of polypropylene per gram of fluorided-chlorided silica-coated alumina per hour, under slurry polymerization conditions, with a triisobutyla-luminum co-catalyst, and a polymerization temperature of 70° C. and a reactor pressure of 450 psig.

Embodiment 39. The composition defined in any one of embodiments 1-38, wherein a catalyst activity of the catalyst composition is in any range disclosed herein, e.g., greater than about 100,000 grams, greater than about 200,000 grams, greater than about 500,000 grams, etc., of polypropylene per gram of the metallocene compound per hour, under slurry polymerization conditions, with a triisobutylaluminum co-catalyst, and a polymerization temperature of 70° C. and a reactor pressure of 450 psig.

Embodiment 40. The composition defined in any one of embodiments 1-39, wherein a catalyst activity of the catalyst composition is greater (e.g., at least 5% greater, at least 10% greater, etc.) than that of a catalyst system containing chlorided silica-coated alumina and/or greater than that of a catalyst system containing fluorided silica-coated alumina.

Embodiment 41. The composition defined in any one of embodiments 1-40, wherein a catalyst activity of the catalyst composition is greater (e.g., at least 25% greater, at least 100% greater, etc.) than that of a catalyst system containing chlorided-fluorided silica-coated alumina (i.e., where the sequence of chloriding and fluoriding is reversed).

Embodiment 42. An olefin polymerization process, the process comprising contacting the catalyst composition defined in any one of the preceding embodiments with an olefin monomer and an optional olefin comonomer in a polymerization reactor system under polymerization conditions to produce an olefin polymer.

Embodiment 43. The process defined in embodiment 42, wherein the olefin monomer comprises any olefin monomer disclosed herein, e.g., any $C_2$-$C_{20}$ olefin.

Embodiment 44. The process defined in embodiment 42 or 43, wherein the olefin monomer and the optional olefin comonomer independently comprise a $C_2$-$C_{20}$ alpha-olefin.

Embodiment 45. The process defined in any one of embodiments 42-44, wherein the olefin monomer comprises ethylene.

Embodiment 46. The process defined in any one of embodiments 42-45, wherein the catalyst composition is contacted with ethylene and an olefin comonomer comprising a $C_3$-$C_{10}$ alpha-olefin.

Embodiment 47. The process defined in any one of embodiments 42-46, wherein the catalyst composition is contacted with ethylene and an olefin comonomer comprising 1-butene, 1-hexene, 1-octene, or a mixture thereof.

Embodiment 48. The process defined in any one of embodiments 42-44, wherein the olefin monomer comprises Propylene.

Embodiment 49. The process defined in any one of embodiments 42-48, wherein the polymerization reactor system comprises a batch reactor, a slurry reactor, a gas-phase reactor, a solution reactor, a high pressure reactor, a tubular reactor, an autoclave reactor, or a combination thereof.

Embodiment 50. The process defined in any one of embodiments 42-49, wherein the polymerization reactor system comprises a slurry reactor, a gas-phase reactor, a solution reactor, or a combination thereof.

Embodiment 51. The process defined in any one of embodiments 42-50, wherein the polymerization reactor system comprises a loop slurry reactor.

Embodiment 52. The process defined in any one of embodiments 42-51, wherein the polymerization reactor system comprises a single reactor.

Embodiment 53. The process defined in any one of embodiments 42-51, wherein the polymerization reactor system comprises 2 reactors.

Embodiment 54. The process defined in any one of embodiments 42-51, wherein the polymerization reactor system comprises more than 2 reactors.

Embodiment 55. The process defined in any one of embodiments 42-54, wherein the olefin polymer comprises any olefin polymer disclosed herein.

Embodiment 56. The process defined in any one of embodiments 42-55, wherein the olefin polymer is an ethylene/1-butene copolymer, an ethylene/1-hexene copolymer, or an ethylene/1-octene copolymer.

Embodiment 57. The process defined in any one of embodiments 42-55, wherein the olefin polymer is an ethylene/1-hexene copolymer.

Embodiment 58. The process defined in any one of embodiments 42-55, wherein the olefin polymer is a polypropylene homopolymer or a propylene-based copolymer.

Embodiment 59. The process defined in any one of embodiments 42-58, wherein the polymerization conditions comprise a polymerization reaction temperature in a range from about 60° C. to about 120° C. and a reaction pressure in a range from about 200 to about 1000 psig (about 1.4 to about 6.9 MPa).

Embodiment 60. The process defined in any one of embodiments 42-59, wherein the polymerization conditions are substantially constant, e.g., for a particular polymer grade.

Embodiment 61. The process defined in any one of embodiments 42-60, wherein no hydrogen is added to the polymerization reactor system.

Embodiment 62. The process defined in any one of embodiments 42-60, wherein hydrogen is added to the polymerization reactor system.

Embodiment 63. The process defined in any one of embodiments 42-62, wherein the number-average molecular weight (Mn) of the olefin polymer produced by the process is in any range disclosed herein, e.g., from about 5,000 to about 150,000 g/mol, from about 5,000 to about 50,000 g/mol, from about 10,000 to about 100,000 g/mol, etc.

Embodiment 64. The process defined in any one of embodiments 42-63, wherein the weight-average molecular weight (Mw) of the olefin polymer produced by the process is in any range disclosed herein, e.g., from about 50,000 to about 700,000 g/mol, from about 75,000 to about 500,000 g/mol, from about 100,000 to about 400,000 g/mol, etc.

Embodiment 65. The process defined in any one of embodiments 42-64, wherein the density of the olefin polymer produced by the process is in any range disclosed herein, e.g., from about 0.89 to about 0.96 g/cm$^3$, from about 0.91 to about 0.95 g/cm$^3$, from about 0.91 to about 0.94 g/cm$^3$, etc.

Embodiment 66. The process defined in any one of embodiments 42-65, wherein the melt index (MI) of the olefin polymer produced by the process is in any range disclosed herein, e.g., from 0 to about 25 g/10 min, from about 0.1 to about 10 g/10 min, from about 0.5 to about 3 g/10 min, etc.

Embodiment 67. An olefin polymer produced by the olefin polymerization process defined in any one of embodiments 42-66.

Embodiment 68. An article of manufacture comprising the olefin polymer defined in embodiment 67.

Embodiment 69. A method for forming or preparing an article of manufacture comprising an olefin polymer, the method comprising (i) performing the olefin polymerization process defined in any one of embodiments 42-66 to produce the olefin polymer, and (ii) forming the article of manufacture comprising the olefin polymer, e.g., via any technique disclosed herein.

Embodiment 70. The article defined in embodiment 68 or 69, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

Embodiment 71. The composition, process, polymer, article, or method defined in any one of embodiments 1-70, wherein the fluorided-chlorided silica-coated alumina is produced by a process comprising:

calcining a silica-coated alumina (e.g., any silica-coated alumina disclosed herein) at a peak calcining temperature to produce a calcined silica-coated alumina;

contacting the calcined silica-coated alumina with a chlorine-containing compound and calcining at a peak chloriding temperature to produce a chlorided silica-coated alumina; and contacting the chlorided silica-coated alumina with a fluorine-containing compound and calcining at a peak fluoriding temperature to produce the fluorided-chlorided silica-coated alumina.

Embodiment 72. A process to produce a fluorided-chlorided silica-coated alumina, the process comprising:

calcining a silica-coated alumina (e.g., any silica-coated alumina disclosed herein) at a peak calcining temperature to produce a calcined silica-coated alumina;

contacting the calcined silica-coated alumina with a chlorine-containing compound and calcining at a peak chloriding temperature to produce a chlorided silica-coated alumina; and contacting the chlorided silica-coated alumina with a fluorine-containing compound and calcining at a peak fluoriding temperature to produce the fluorided-chlorided silica-coated alumina.

Embodiment 73. The composition, process, polymer, article, or method defined in embodiment 71 or 72, wherein the peak calcining temperature is in any range disclosed herein, e.g., from about 400° C. to about 1000° C., from about 400° C. to about 900° C., from about 500° C. to about 800° C., etc.

Embodiment 74. The composition, process, polymer, article, or method defined in any one of embodiments 71-73, wherein the peak chloriding temperature is in any range disclosed herein, e.g., from about 200° C. to about 700° C., from about 300° C. to about 600° C., from about 400° C. to about 550° C., etc.

Embodiment 75. The composition, process, polymer, article, or method defined in any one of embodiments 71-74, wherein the peak fluoriding temperature is in any range disclosed herein, e.g., from about 200° C. to about 700° C., from about 300° C. to about 600° C., from about 400° C. to about 550° C., etc.

Embodiment 76. The composition, process, polymer, article, or method defined in any one of embodiments 71-75, wherein the peak chloriding temperature is equal to or less than the peak calcining temperature by any amount disclosed herein, e.g., from 0° C. to about 600° C., from about 25° C. to about 400° C., from about 100° C. to about 400° C., etc.

Embodiment 77. The composition, process, polymer, article, or method defined in any one of embodiments 71-76, wherein the peak fluoriding temperature is equal to or less than the peak calcining temperature by any amount disclosed herein, e.g., from 0° C. to about 600° C., from about 25° C. to about 400° C., from about 100° C. to about 400° C., etc.

Embodiment 78. The composition, process, polymer, article, or method defined in any one of embodiments 71-77, wherein the chlorine-containing compound comprises any chlorine-containing compound disclosed herein.

Embodiment 79. The composition, process, polymer, article, or method defined in any one of embodiments 71-78, wherein the fluorine-containing compound comprises any fluorine-containing compound disclosed herein.

Embodiment 80. The composition, process, polymer, article, or method defined in any one of embodiments 71-79, wherein at least one calcining operation is conducted in an inert atmosphere.

Embodiment 81. The composition, process, polymer, article, or method defined in any one of embodiments 71-79, wherein at least one calcining operation is conducted in an oxidizing atmosphere.

Embodiment 82. The composition, process, polymer, article, or method defined in any one of embodiments 71-79, wherein at least one calcining operation is conducted in a reducing atmosphere.

Embodiment 83. The composition, process, polymer, article, or method defined in any one of embodiments 71-82, wherein the contacting of the calcined silica-coated alumina and the chlorine-containing compound is in the vapor phase.

Embodiment 84. The composition, process, polymer, article, or method defined in any one of embodiments 71-82, wherein the contacting of the calcined silica-coated alumina and the chlorine-containing compound is in the liquid phase.

Embodiment 85. The composition, process, polymer, article, or method defined in any one of embodiments 71-84, wherein the contacting of the chlorided silica-coated alumina and the fluorine-containing compound is in the vapor phase.

Embodiment 86. The composition, process, polymer, article, or method defined in any one of embodiments 71-84, wherein the contacting of the chlorided silica-coated alumina and the fluorine-containing compound is in the liquid phase.

Embodiment 87. The composition, process, polymer, article, or method defined in any one of embodiments 71-86, wherein the silica-coated alumina comprises silica in any range of weight percentages disclosed herein, e.g., from about 10 to about 80 wt. % silica, from about 20 to about 70 wt. % silica, from about 25 to about 50 wt. % silica, etc., based on the weight of the silica-coated alumina.

Embodiment 88. The composition, process, polymer, article, or method defined in any one of embodiments 71-87, wherein the fluorided-chlorided silica-coated alumina comprises an amount of fluorine in any range of weight percentages disclosed herein, e.g., from about 2 to about 15 wt. % F, from about 3 to about 10 wt. % F, from about 4 to about 9 wt. % F, etc., based on the weight of the fluorided-chlorided silica-coated alumina.

Embodiment 89. The composition, process, polymer, article, or method defined in any one of embodiments 71-88, wherein the fluorided-chlorided silica-coated alumina comprises an amount of chlorine in any range of weight percentages disclosed herein, e.g., from about 0.1 to about 20 wt. % Cl, from about 1 to about 10 wt. % Cl, from about 2 to about 7 wt. % Cl, etc., based on the weight of the fluorided-chlorided silica-coated alumina.

Embodiment 90. The composition, process, polymer, article, or method defined in any one of embodiments 71-89, wherein the fluorided-chlorided silica-coated alumina has a pore volume in any range of pore volumes disclosed herein, e.g., from about 0.5 to about 2.5 mL/g, from about 0.9 to about 2.0 mL/g, from about 1.0 to about 1.5 mL/g, etc.

Embodiment 91. The composition, process, polymer, article, or method defined in any one of embodiments 71-90, wherein the fluorided-chlorided silica-coated alumina has a surface area in any range of surface areas disclosed herein, e.g., from about 150 to about 700 m$^2$/g, from about 200 to about 700 m$^2$/g, from about 250 to about 500 m$^2$/g, etc.

Embodiment 92. A fluorided-chlorided silica-coated alumina produced by the process defined in any one of embodiments 72-91.

We claim:

1. A catalyst composition comprising:
    an activator-support comprising a fluorided-chlorided silica-coated alumina;
    a metallocene compound; and
    optionally, a co-catalyst; wherein:
    a catalyst activity of the catalyst composition is greater than that of a catalyst system containing a fluorided silica-coated alumina, under the same polymerization conditions.

2. The composition of claim 1, wherein:
    the fluorided-chlorided silica-coated alumina comprises from about 10 to about 80 wt. % silica, based on the weight of the silica-coated alumina;
    the fluorided-chlorided silica-coated alumina comprises from about 2 to about 15 wt. % F, based on the weight of the fluorided-chlorided silica-coated alumina; and
    the fluorided-chlorided silica-coated alumina comprises from about 1 to about 10 wt. % Cl, based on the weight of the fluorided-chlorided silica-coated alumina.

3. The composition of claim 1, wherein the catalyst composition comprises an activator-support comprising a fluorided-chlorided silica-coated alumina, a metallocene compound, and a co-catalyst, wherein the co-catalyst comprises an aluminoxane compound, an organoboron or organoborate compound, an ionizing ionic compound, an organoaluminum compound, an organozinc compound, an organomagnesium compound, an organolithium compound, or any combination thereof.

4. The composition of claim 3, wherein the co-catalyst comprises an organoaluminum compound, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

5. The composition of claim 1, wherein the fluorided-chlorided silica-coated alumina is produced by a process comprising:
    (a) calcining a silica-coated alumina at a peak calcining temperature to produce a calcined silica-coated alumina;
    (b) contacting the calcined silica-coated alumina with a chlorine-containing compound and calcining at a peak chloriding temperature to produce a chlorided silica-coated alumina; and
    (c) contacting the chlorided silica-coated alumina with a fluorine-containing compound and calcining at a peak fluoriding temperature to produce the fluorided-chlorided silica-coated alumina.

6. The composition of claim 1, wherein:
    a catalyst activity of the catalyst composition is greater than about 1000 grams of polyethylene per gram of fluorided-chlorided silica-coated alumina per hour, under slurry polymerization conditions, with a triisobutylaluminum co-catalyst, using isobutane as a diluent, and with a polymerization temperature of 95° C. and a reactor pressure of 400 psig; and
    a catalyst activity of the catalyst composition is greater than about 1000 grams of polypropylene per gram of fluorided-chlorided silica-coated alumina per hour, under slurry polymerization conditions, with a triisobutylaluminum co-catalyst, and a polymerization temperature of 70° C. and a reactor pressure of 450 psig.

7. The composition of claim 1, wherein:
    a catalyst activity of the catalyst composition is greater than that of a catalyst system containing a chlorided silica-coated alumina, under the same polymerization conditions.

8. The composition of claim 1, wherein a catalyst activity of the catalyst composition is greater than that of a catalyst system containing a chlorided-fluorided silica-coated alumina, under the same polymerization conditions.

9. An olefin polymerization process, the process comprising contacting a catalyst composition with an olefin monomer and an optional olefin comonomer in a polymerization reactor system under polymerization conditions to produce an olefin polymer, wherein the catalyst composition comprises an activator-support comprising a fluorided-chlorided silica-coated alumina, a metallocene compound, and an optional co-catalyst; wherein:
    a catalyst activity of the catalyst composition is greater than that of a catalyst system containing a fluorided silica-coated alumina, under the same polymerization conditions.

10. The process of claim 9, wherein the polymerization reactor system comprises a batch reactor, slurry reactor, gas-phase reactor, solution reactor, high pressure reactor, tubular reactor, autoclave reactor, or any combination thereof.

11. The process of claim 9, wherein the olefin monomer comprises ethylene or propylene.

12. The process of claim 9, wherein the catalyst composition is contacted with ethylene and an olefin comonomer comprising 1-butene, 1-hexene, 1-octene, or a mixture thereof.

13. A process to produce a fluorided-chlorided silica-coated alumina, the process comprising:
    (a) calcining a silica-coated alumina at a peak calcining temperature to produce a calcined silica-coated alumina;
    (b) contacting the calcined silica-coated alumina with a chlorine-containing compound and calcining at a peak chloriding temperature to produce a chlorided silica-coated alumina; and
    (c) contacting the chlorided silica-coated alumina with a fluorine-containing compound and calcining at a peak fluoriding temperature to produce the fluorided-chlorided silica-coated alumina; wherein:

an activity of a catalyst composition containing the fluorided-chlorided silica-coated alumina is greater than that of a catalyst system containing a chlorided-fluorided silica-coated alumina, under the same polymerization conditions.

14. The process of claim 13, wherein:
the peak calcining temperature is in a range from about 400 to about 1000° C.;
the peak chloriding temperature is less than or equal to the peak calcining temperature; and
the peak fluoriding temperature is less than or equal to the peak calcining temperature.

15. The process of claim 13, wherein:
the peak calcining temperature is in a range from about 400 to about 1000° C.;
the peak chloriding temperature is in a range from about 300 to about 700° C. and is less than or equal to the peak calcining temperature; and
the peak fluoriding temperature is in a range from about 300 to about 700° C. and is less than or equal to the peak calcining temperature.

16. The process of claim 13, wherein:
the fluorine-containing compound comprises HF, $F_2$, perfluorohexane, perfluoroacetic anhydride, tetrafluoroethane, ammonium fluoride, ammonium bifluoride, or a combination thereof; and
the chlorine-containing compound comprises HCl, $Cl_2$, carbon tetrachloride, tetrachloroethylene, or a combination thereof.

17. The process of claim 13, wherein:
the contacting of the calcined silica-coated alumina and the chlorine-containing compound is in the vapor phase; and
the contacting of the chlorided silica-coated alumina and the fluorine-containing compound is in the vapor phase.

18. The process of claim 13, wherein:
the contacting of the calcined silica-coated alumina and the chlorine-containing compound is in the liquid phase; and
the contacting of the chlorided silica-coated alumina and the fluorine-containing compound is in the liquid phase.

19. The process of claim 13, wherein:
the silica-coated alumina comprises from about 10 to about 80 wt. % silica, based on the weight of the silica-coated alumina;
the fluorided-chlorided silica-coated alumina comprises from about 2 to about 15 wt. % F, based on the weight of the fluorided-chlorided silica-coated alumina; and
the fluorided-chlorided silica-coated alumina comprises from about 3 to about 10 wt. % Cl, based on the weight of the fluorided-chlorided silica-coated alumina.

20. A fluorided-chlorided silica-coated alumina produced by the process of claim 13, wherein the fluorided-chlorided silica-coated alumina has:
a pore volume in a range from about 0.9 to about 2.0 mL/g; and
a surface area in a range from about 200 to about 700 $m^2$/g.

* * * * *